(12) United States Patent
Sheynblat et al.

(10) Patent No.: US 6,313,786 B1
(45) Date of Patent: Nov. 6, 2001

(54) METHOD AND APPARATUS FOR MEASUREMENT PROCESSING OF SATELLITE POSITIONING SYSTEM (SPS) SIGNALS

(75) Inventors: Leonid Sheynblat, Belmont; Norman F. Krasner, San Carlos, both of CA (US)

(73) Assignee: SnapTrack, Inc., Campbell, CA (US)

( * ) Notice: Subject to any disclaimer, the term of this patent is extended or adjusted under 35 U.S.C. 154(b) by 0 days.

(21) Appl. No.: 09/241,334

(22) Filed: Feb. 1, 1999

Related U.S. Application Data

(63) Continuation-in-part of application No. 09/109,112, filed on Jul. 2, 1998, now Pat. No. 6,236,354.

(51) Int. Cl.[7] .............................. H04B 7/185; G01S 5/02
(52) U.S. Cl. .................. 342/357.02; 342/457; 342/418; 342/357.05; 701/214; 455/456
(58) Field of Search ................................. 342/457, 418, 342/357.05, 357.01, 357.02; 701/214; 455/456

(56) References Cited

U.S. PATENT DOCUMENTS

| | | |
|---|---|---|
| 5,379,324 | 1/1995 | Mueller et al. . |
| 5,692,008 | 11/1997 | Van Nee . |
| 5,890,068 * | 3/1999 | Fattouche et al. .................... 455/456 |
| 5,920,278 * | 7/1999 | Tyler et al. ............................ 342/33 |
| 6,040,800 * | 3/2000 | Raith et al. .......................... 342/387 |

FOREIGN PATENT DOCUMENTS

WO 98/25157   6/1998   (WO) .

OTHER PUBLICATIONS

PCT International Search Report for PCT Application No. PCT/US00/01704, mailed Jul. 28, 2000.

* cited by examiner

Primary Examiner—Theodore M. Blum
(74) Attorney, Agent, or Firm—Blakely, Sokoloff, Taylor & Zafman

(57) ABSTRACT

A method and apparatus is disclosed for measurement processing of Satellite Positioning System (SPS) signals. A plurality of SPS signals from a corresponding plurality of SPS satellites are received in an SPS receiver. The signal environment corresponding to the location in which the SPS receiver is located is characterized to produce signal environment data. In one exemplary embodiment, an information source, such as a cellular network based database, is searched to retrieve the signal environment data given an approximate location of the GPS receiver. This approximate location may be specified by a location of a cell site which is in cellular radio communication with a cellular communication device which is co-located with the GPS receiver. One or more parameters related to signal characteristics of the satellite signals are defined. Threshold values for the parameters are determined using the signal environment data. Code phases corresponding to times of arrival of respective satellite signals from the plurality of satellites are measured. The data representing measured times of arrival are examined using threshold values for the parameters to produce a set of times of arrival from which a location fix for the GPS receiver is calculated. Other methods and apparatuses for other embodiments of the invention are also described.

57 Claims, 13 Drawing Sheets

| Sat. No. | SNR Out (dB) | SIR Out (dB) | Peak Width (1/2 chips) | Azimuth (degrees) | Elevation (degrees) | Code Phase (1/2 chips) | Doppler (Hz) |
|---|---|---|---|---|---|---|---|
| 2 | 42.80 | 34.00 | 1.62 | 69.65 | 47.66 | 195.11 | -1205 |
| 4 | 43.10 | 35.00 | 1.68 | 154.58 | 27.21 | 144.32 | 3219 |
| 7 | 45.80 | 30.50 | 1.74 | 40.03 | 73.74 | 1400.94 | -923 |
| 9 | 44.30 | 33.00 | 1.68 | 312.93 | 31.33 | 289.90 | 2845 |
| 15 | 33.60 | 32.30 | 2.00 | 35.92 | 8.32 | 1075.13 | -2309 |
| 26 | 44.50 | 31.30 | 1.66 | 253.71 | 32.67 | 1796.16 | -1619 |
| 27 | 24.20 | 23.50 | 1.02 | 142.03 | 23.75 | 648.90 | -3467 |

FIG. 2

METHOD AND APPARATUS FOR MEASUREMENT PROCESSING OF SATELLITE POSITIONING SYSTEM (SPS) SIGNALS

CROSS-REFERENCE TO RELATED APPLICATION

This application is a continuation-in-part of co-pending application Ser. No. 09/109,112, filed Jul. 2, 1998, now U.S. Pat. No. 6,236,354.

FIELD OF THE INVENTION

The present invention relates generally to the field of satellite positioning systems (SPS), such as global positioning system (GPS) receivers, and more particularly to processing of SPS signals.

BACKGROUND OF THE INVENTION

Global Positioning System (GPS) receivers normally determine their position by computing times of arrival of signals transmitted simultaneously from a multiplicity of GPS (or NAVSTAR) satellites. These satellites transmit, as part of their message, both satellite positioning data as well as data on clock timing, so-called "ephemeris" data. The process of searching for and acquiring GPS signals, reading the ephemeris data for a multiplicity of satellites and computing the location of the receiver from this data is time consuming, often requiring several minutes. In many cases, this lengthy processing time is unacceptable and, furthermore, greatly limits battery life in miniaturized portable applications.

GPS receiving systems have two principal functions. The first is the computation of the pseudoranges to the various GPS satellites, and the second is the computation of the position of the receiver using these pseudoranges and satellite timing and ephemeris data. The pseudoranges are simply the times of arrival of satellite signals measured by a local clock. This definition of pseudorange is sometimes also called code phase. The satellite ephemeris and timing data is extracted from the GPS signal once it is acquired and tracked. As stated above, collecting this information normally takes a relatively long time (30 seconds to several minutes) and must be accomplished with a good received signal level in order to achieve low error rates.

Most GPS receivers utilize correlation methods to compute pseudoranges. These correlation methods are performed in real time, often with hardware correlators. GPS signals contain high rate repetitive signals called pseudorandom (PN) sequences. The codes available for civilian applications are called C/A (coarse/acquisition) codes, and have a binary phase-reversal rate, or "chipping" rate, of 1.023 MHz and a repetition period of 1023 chips for a code period of 1 millisecond. The code sequences belong to a family known as Gold codes, and each GPS satellite broadcasts a signal with a unique Gold code.

For a signal received from a given GPS satellite, following a downconversion process to baseband, a correlation receiver multiplies the received signal by a stored replica of the appropriate Gold code contained within its local memory, and then integrates, or low-pass filters, the product in order to obtain an indication of the presence of the signal. This process is termed a "correlation" operation. By sequentially adjusting the relative timing of this stored replica relative to the received signal, and observing the correlation output, the receiver can determine the time delay between the received signal and a local clock. The initial determination of the presence of such an output is termed "acquisition." Once acquisition occurs, the process enters the "tracking" phase in which the timing of the local reference is adjusted in small amounts in order to maintain a high correlation output. The correlation output during the tracking phase may be viewed as the GPS signal with the pseudorandom code removed, or, in common terminology, "despread." This signal is narrow band, with a bandwidth commensurate with a 50 bit per second binary phase shift keyed (BPSK) data signal which is superimposed on the GPS waveform.

The correlation acquisition process is very time consuming, especially if received signals are weak. To improve acquisition time, most GPS receivers utilize a multiplicity of correlators (up to 36 typically) which allows a parallel search for correlation peaks.

Conventional GPS receiving equipment is typically designed to receive GPS signals in open spaces since the satellite signals are line-of-sight and can thus be blocked by metal and other materials. Improved GPS receivers provide signal sensitivity that allows tracking GPS satellite signals indoors, or in the presence of weak multipath signals or signals that are pure reflections. The ability to acquire such weak GPS signals, however, typically causes other problems. For example, the simultaneous tracking of strong and weak signals may cause the receiver to lock on to a cross-correlated signal, which is not a true signal. Instead of finding a weak true peak, a stronger cross-correlated peak may be acquired. Tracking a weak satellite signal does not guarantee that it is a direct signal. This weak signal may be a reflected signal or a combination of direct and indirect signals. The combined signals are referred to as multipath signals. The path of the reflected signal is typically longer than the path of the direct signal. This difference in path length causes the time-of-arrival measurement of the reflected signal to be delayed or the corresponding code phase measurement to contain a positive bias. In general, the magnitude of the bias is proportional to the relative delay between the reflected and direct paths. The possible absence of a direct signal component makes the existing multipath mitigation techniques (such as a narrow correlator or a strobe correlator) obsolete.

It is therefore desirable to provide a measurement processing algorithm that optimally utilizes various types of available data to achieve an optimal location solution.

SUMMARY OF THE INVENTION

A method and apparatus for measurement processing of SPS signals is disclosed. In one embodiment of the present invention, a plurality of GPS signals from a corresponding plurality of GPS satellites are received in a GPS receiver. The signal environment corresponding to the location in which the GPS receiver is located is characterized to produce signal environment data. In one exemplary embodiment, an information source, such as a cellular network based database, is searched to retrieve the signal environment data given an approximate location of the GPS receiver. This approximate location may be specified by a location of a cell site which is in cellular radio communication with a cellular communication device which is co-located with the GPS receiver. One or more parameters related to signal characteristics of the satellite signals are defined. Threshold values for the parameters are determined using the signal environment data. Code phases corresponding to times of arrival of respective satellite signals from the plurality of satellites are measured. Data representing measured times of arrival are tested using threshold values for the parameters to produce a set of times of arrival from which a location solution for the GPS receiver is calculated.

In another embodiment of the invention, the signal environment corresponding to the location in which a GPS receiver is located is characterized to produce signal environment data. This signal environment data reflects the manner in which SPS signals are propagated in the location. The signal environment data is used to determine at least one processing value which is, in turn, used to process data representative of SPS signals received by the GPS receiver.

In one particular embodiment of the invention, a cell based information source (e.g. a cellular phone network based database) is used to determine a signal environment data which represents a manner in which SPS signals are propagated in a location at which an SPS receiver is located, and SPS signals by the SPS receiver at this location are processed in a manner specified by the signal environment data.

In another embodiment of the invention, a method of processing SPS signals determines the existence of two (or more) correlation peaks from the same set of SPS signals from a first SPS satellite. A measurement representing a time-of-arrival of the set of SPS signals is derived from the two (or more) correlation peaks; typically the earlier correlation peak represents a direct path of the set of SPS signals, rather than a reflected path, and the earlier correlation peak is used to derive the measurement representing the time-of-arrival of the set of SPS signals.

Other features and embodiments of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which references indicate similar elements and in which:

FIG. 2 is a table that illustrates an example of data elements with exemplary values for seven different in-view satellites, that may be used in an embodiment of the present invention.

DETAILED DESCRIPTION

A method and apparatus for measurement processing Satellite Positioning System (SPS) signals is described.

In the following discussion, embodiments of the present invention will be described with reference to application in the United States Global Positioning System (GPS) system, which is an example of an SPS system. It should be evident, however, that these methods are equally applicable to other satellite positioning systems, such as the Russian Glonass system. Thus, the term "GPS" used herein includes such alternative satellite positioning systems, including the Russian Glonass system. Likewise, the term "GPS signals" includes signals from alternative satellite positioning systems.

Furthermore, although embodiments of the present invention are described with reference to GPS satellites, it will be appreciated that the teachings are equally applicable to positioning systems which utilize pseudolites or a combination of satellites and pseudolites. Pseudolites are ground based transmitters which broadcast a PN code (similar to a GPS signal) modulated on an L-band (or other frequency) carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings, urban canyons or other enclosed areas. The term "satellite", as used herein, is intended to include pseudolites or equivalents of pseudolites, and the term GPS signals, as used herein, is intended to include GPS-like signals from pseudolites or equivalents of pseudolites.

GPS Receiving System

Figure 1:
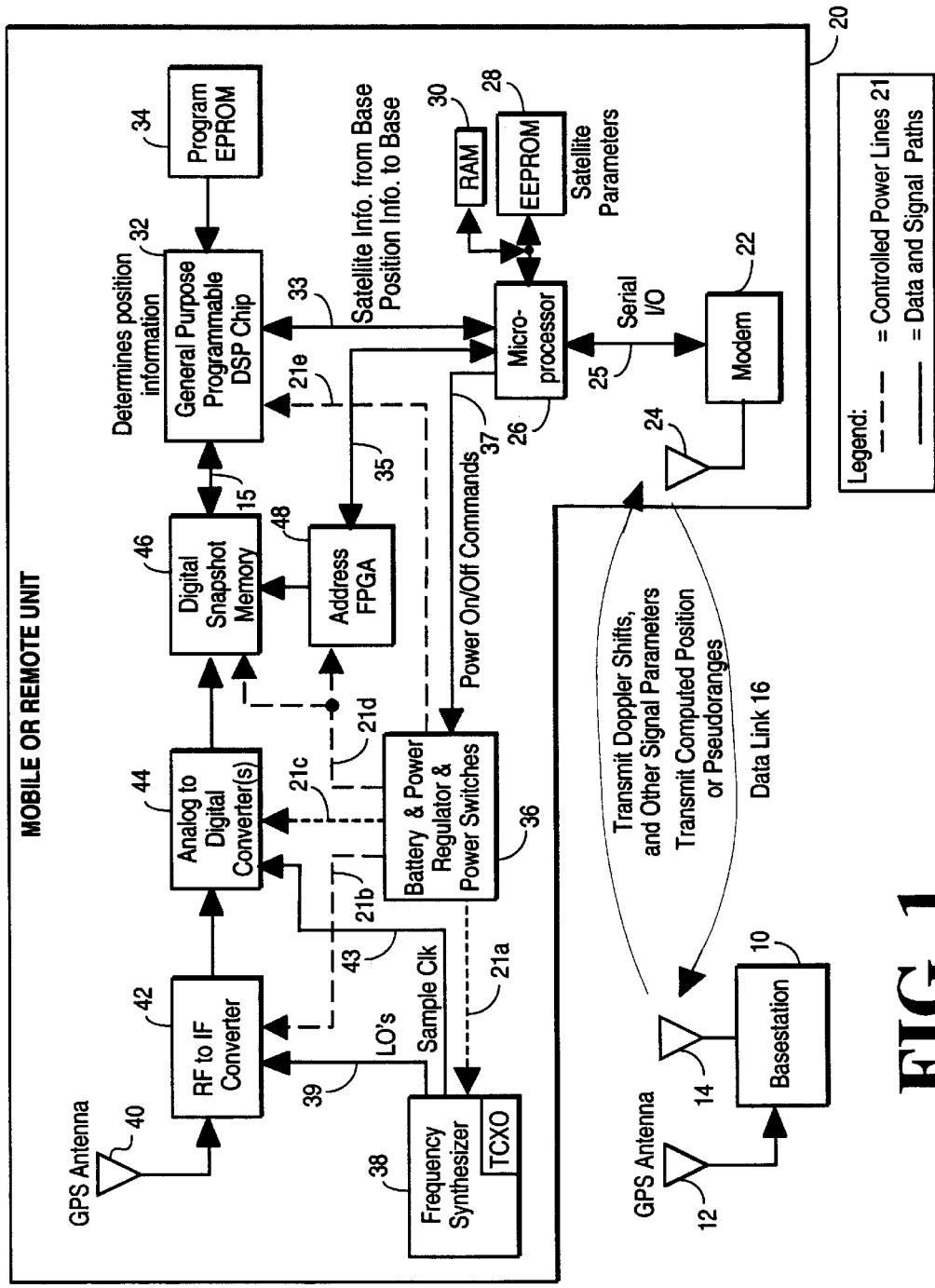
FIG. 1 is a block diagram of one example of a GPS receiving system utilizing embodiments of the present invention, and shows data links that may exist between a basestation and a remote GPS receiver.

FIG. 1 is a block diagram of a GPS receiving system which may be used to implement methods of the present invention. The GPS receiving system of FIG. 1 includes a mobile or remote GPS receiver unit 20 which includes a GPS processing stage and a communication stage. Thus, GPS receiver unit 20 includes circuitry for performing the functions required for processing GPS signals, as well as the functions required for processing communication signals transmitted and received through a communication link. The communication link, such as data link 16, is typically a radio frequency communication link (e.g. a cellular telephone communication link) to another communication component, such as a basestation 10 having a communication antenna 14.

In accordance with traditional GPS methods, GPS receiver 20 receives GPS signals transmitted from orbiting GPS satellites and determines the times-of-arrival of unique pseudo-random noise (PN) codes by comparing the time shifts between the received PN code signal sequences and internally generated PN signal sequences. GPS signals are received through GPS antenna 40 and input to an acquisition circuit which acquires the PN codes for the various received satellites. The navigational data (e.g., pseudorange data) produced by the acquisition circuit are processed by a processor for transmission over data communication link 16.

GPS receiver 20 also includes communication transceiver section, shown as modem 22, for communication over data link 16. Modem 22 is coupled to communication antenna 24. Modem 24 transmits navigational data processed by GPS receiver 20 through communication signals (typically radio frequency signals) to a remote basestation, such as basestation 10. The navigational data may be the actual latitude, longitude, and altitude of the GPS receiver, or it may be raw or partially processed data. Received communication signals are input to modem 22 and passed to a processor for processing and possible output through an audio speaker.

According to one embodiment of the present invention pseudorange data generated by GPS receiver 20 is transmitted over data link 16 to basestation 10. Basestation 10 then determines the location of GPS receiver 20 based on the pseudorange data from the combined receiver, the time at which the pseudoranges were measured, and ephemeris data received from its own GPS receiver (e.g., through GPS antenna 12) or other sources of such data, such as a network of GPS reference receivers. The location data can then be transmitted back to GPS receiver 20 or to other remote locations. The data link 16 between GPS receiver 20 and basestation 10 may be implemented in a number of various embodiments including a direct link or a cellular telephone link, or any other type of wireless link.

In one embodiment of the present invention, basestation 10 commands the GPS receiver 20 to perform a location measurement through a message transmitted over data link 16. Within this message, basestation 10 also sends Doppler related information (or other information, such as Satellite Almanac, from which Doppler may be derived) for the satellites in view. Doppler related information may also include Doppler rate of change, Doppler acceleration or other mathematical representations of the Doppler related information. The Doppler information is a form of satellite data information related to the satellite position and velocity and is typically in the form of frequency information. The message will typically also specify an identification of the particular satellites in view, or other initialization data. The message is received by modem 22, and is stored in a memory 30 coupled to microprocessor 26. Microprocessor 26 handles data information transfer between the remote unit processing elements 32–48 and the modem 22.

The Doppler information included in the message is typically very short in duration since the required accuracy of such Doppler information is not high. For example, if 10 Hz accuracy were required and the maximum Doppler is approximately ±7 kHz, then an 11-bit word would suffice for each satellite in view. Additional bits would be required to transmit Doppler rate of change information. If eight satellites were in view, then 88 bits would be required to specify all such Dopplers. The use of this information eliminates the requirement for remote 20 to search for such Dopplers, thereby reducing its processing time by in excess of a factor of ten. The use of the Doppler information also allows the GPS receiver 20 to more quickly process a sample of GPS signals such as a collection of digitized GPS signals stored in a digital memory.

When the GPS receiver 20 receives a command (e.g., from basestation 10) to process GPS signals through a message which includes Doppler information, microprocessor 26 activates the RF to IF Converter 42, analog to digital (A/D) Converter 44 and digital snapshot memory 46 via a battery and power regulator and power switch circuit 36 (and controlled power lines 21a, 21b, 21c and 21d), thereby providing full power to these components. This causes the signals from the GPS satellites which are received via antenna 40 to be downconverted from a radio frequency (RF) to an intermediate frequency (IF), where they subsequently undergo digitization in A/D converter 44. A contiguous set of such data, typically corresponding to a duration of 100 milliseconds to one second (or even longer), is then stored in snapshot memory 46. The addressing of this memory 46 to store this data is controlled by a Field Programmable Gate Array (FPGA) integrated circuit 48. Downconversion of the GPS signals is accomplished using a frequency synthesizer 38 which provides local oscillator signal 39 to the converter 42 as discussed in further detail below.

During the period of time in which the snapshot memory 46 is being filled with the digitized GPS signals from the in-view satellites, DSP microprocessor 32 may be kept in a low power state. The RF to IF Converter 42 and A/D Converter 44 are typically only turned on for a short period of time, sufficient to collect and store the data required for pseudorange calculation. After the data collection is complete, these converter circuits are turned off or power is otherwise reduced via controlled power lines 21b and 21c (while the memory 46 continues to receive full power), thus not contributing to additional power dissipation during the actual pseudorange calculation. The pseudorange calculation is then performed using, in one embodiment of the present invention, a general purpose, programmable Digital Signal Processor (DSP) IC 32. DSP 32 is placed in an active power state by the microprocessor 26 and the circuit 36 via controlled power line 21e prior to performing such calculations.

Figure 12A:
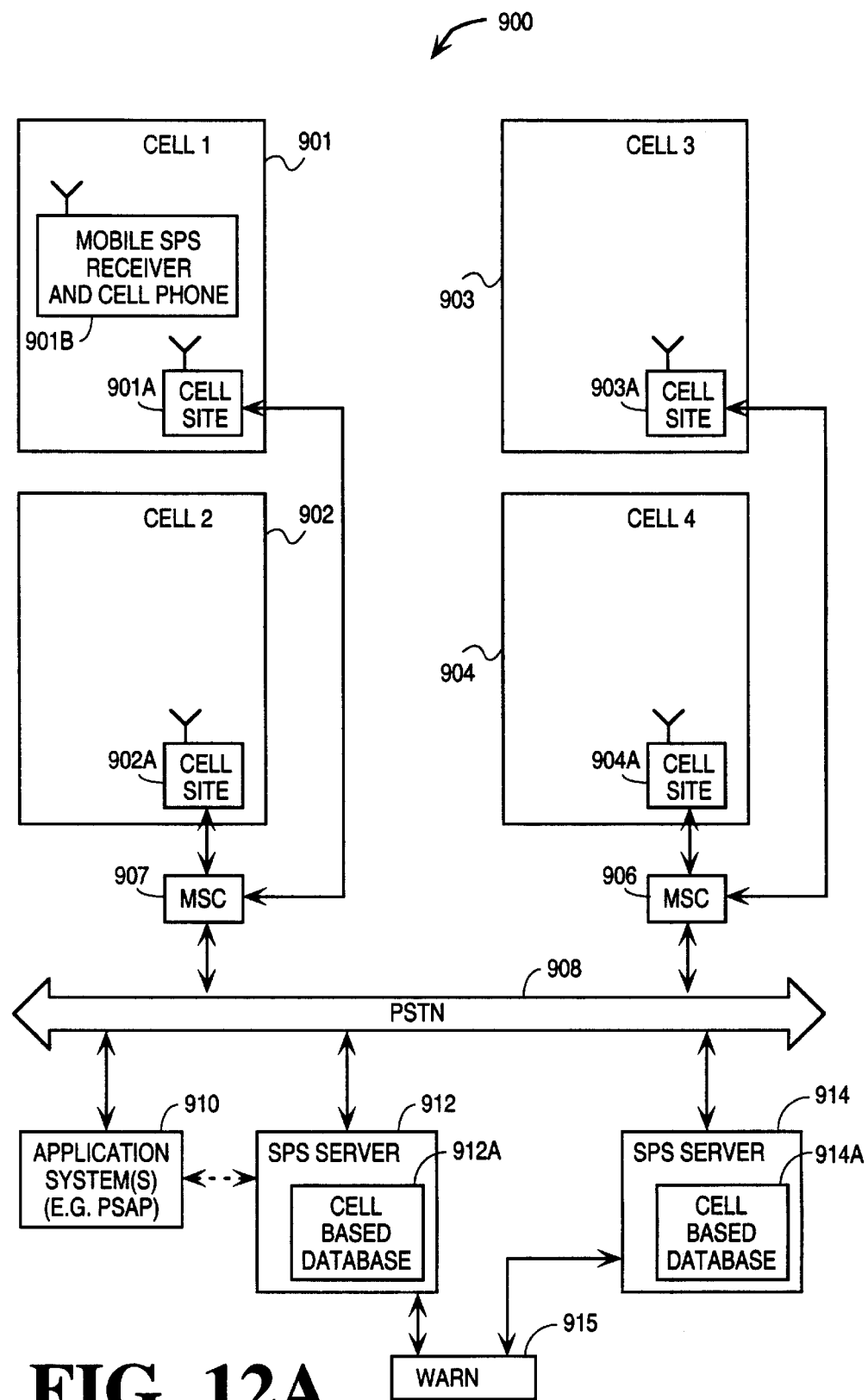
FIG. 12A is an example of a cellular network system which includes a cell based information source.

In one embodiment, DSP 32 is a general purpose and programmable processor, as opposed to a specialized custom digital signal processor, as is used in other GPS units. Once DSP 32 completes its computation of pseudoranges for each of the in-view satellites, it may compute its final position using satellite ephemeris data supplied to it via a data link or gathered through standard demodulation techniques. Alternatively, it may transmit the pseudoranges to a basestation (e.g., basestation 10), which provides a final position computation. FIG. 12A shows an example of a basestation which in this case is referred to as an SPS server. The SPS server is communicatively linked to the SPS receiver/cell phone through a cellular telephone network and a public switched telephone network (PSTN).

In one embodiment of the invention, DSP 32 transmits this position information to the microprocessor 26 via interconnect bus 33. At this time the microprocessor 26 may cause the DSP 32 and memory 46 to again enter a low power state by sending an appropriate control signal to the battery and power regulator circuit 36. Microprocessor 26 then uses modem 22 to transmit the pseudorange data, or position data over data link 16 to basestation 10 for final position computation or for output on a display device (not shown).

It is expected that the position calculations in DSP 32 will typically require less than a few seconds of time, depending upon the amount of data stored in the digital snapshot memory 46 and the speed of the DSP.

As indicated above, digital snapshot memory 46 captures a record corresponding to a relatively long period of time. The efficient processing of this large block of data using fast convolution methods contributes to the ability of the present invention to process signals at low received levels (e.g., when reception is poor due to partial blockage from buildings, trees, etc.). Examples of such methods are described in U.S. Pat. No. 5,663,734. All pseudoranges for visible GPS satellites are computed using this same buffered data. This provides improved performance relative to continuous tracking GPS receivers in situations (such as urban blockage conditions) in which the signal amplitude is rapidly changing.

Different GPS receiver architectures may be used with the present invention. While the foregoing discussion has focused on a GPS receiver with a digital memory and a digital signal processor, other GPS receiver architectures may perform all or portions of the methods of the invention and may form all or portions of the apparatuses of the invention. For example, conventional hardware correlator style GPS receivers may be used with the invention. Also, the types of GPS receivers described in PCT applications PCT/US98/07471 or PCT/US98/11375 or PCT/US97/06946 (Publication No. 97/40398) may be used with the present invention. In each case, the correlator outputs for each SPS satellite (e.g. FIG. 3) are saved for use in the measurement processing techniques of the invention.

In each case, the receiver itself may perform the entire processing of one of these measurement processing techniques or may perform a portion of the processing of the technique and may forward the intermediate processing results to a "server" system, such as an SPS server as shown in FIG. 12A, which server system completes the processing. In the case where the GPS receiver (e.g. mobile unit 20) performs all of the processing for one of these techniques, the GPS receiver may receive aiding data from an external source through its communication link such as a cellular telephone system; this aiding data, such as a characterization of the signal environment (and associated parameter values) may be transmitted to the mobile unit 20. In the case where the GPS receiver performs some of the processing, the GPS receiver will typically store samples of the correlator outputs for each SPS satellite (such as the data shown in FIG. 3), and these correlator outputs are transmitted to the server system which performs a measurement processing technique of the invention.

Measurement Processing

In one embodiment of the present invention, an improved GPS receiver processes several different types of data for each in-view satellite. These data types may include: a code phase corresponding to the maximum correlation peak value also referred to as main peak (measuring time-of-arrival); a set of code phases around the maximum correlation peak value (computed at, for example, ⅛, ¼, ½, 1 C/A code chip or at some other arbitrary spacing); a correlation peak-width (computed at some selected signal level, e.g., 3 dB below peak); a Doppler (measuring code phase rate of change); a signal-to-noise ratio (SNR); a signal-to-interference ratio (SIR); an integration period; and a flag indicating presence of multiple peaks and their location(s) relative to the main peak.

In a typical embodiment of the invention, a signal environment is characterized by using these data types which are measured for SPS signals (e.g. an SNR of an SPS signal), and this represents a manner in which SPS signals are propagated locally (e.g. not in the ionosphere) in the location of the SPS receiver. In a typical example, a locally propagated SPS signal is an SPS signal which is propagated within about 1000 meters of the location of the SPS receiver. That is, the SPS signals which are propagated within about 1000 meters of the location may be considered to be locally propagated SPS signals; this distance may be considered a range from about 0.1 meters from the SPS receiver to about 1000 (to perhaps 2000) meters from the SPS receiver. In another embodiment, a signal environment may be characterized by using these data types which are measured for cellular communication signals (e.g. an SNR of a received cellular telephone communication signal). For example, one or more of these data types may be determined for received cellular communication signals or one or more of these data types may be derived from the power level (e.g. a higher power level suggests lower SNR) of the cellular transmitter in the cellular telephone. The signal environment characterized by measurements of cellular communication signals will typically also represent the manner in which SPS signals are propagated locally in the location of the SPS receiver. It is also noted that processing of cellular communication signals may utilize a characterization of the signal environment.

FIG. 2 is a table that illustrates an example of some of the data elements with exemplary values for seven different in-view satellites, that may be used in an embodiment of the present invention. The satellites are numbered in accordance with their corresponding PRN codes as 2, 4, 7, 9, 15, 26, and 27. Data for each satellite includes signal-to-noise ratio, signal-to-interference ratio, peak-width, azimuth, elevation, code phase and Doppler information.

Figure 3:
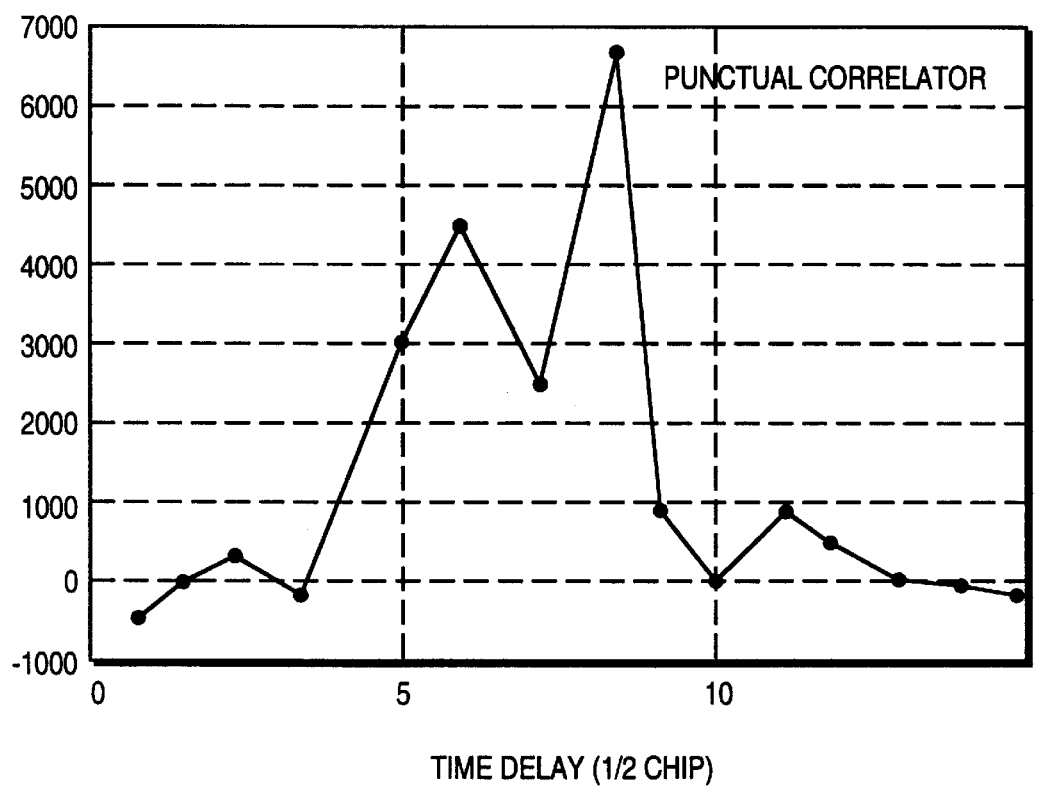
FIG. 3 is a graphical representation of amplitudes of fifteen correlator outputs with ½-chip delays in the vicinity of a punctual channel for a satellite illustrated in FIG. 2.

FIG. 3 illustrates an example of scaled amplitudes of fifteen correlator outputs measured with ½-chip delays in the vicinity of a punctual channel. The waveform of FIG. 3 corresponds to the data values for satellite number 27 shown in the table of FIG. 2. FIG. 3 illustrates an example of "twin-peak" behavior, evidenced by a presence of two strong signals. FIG. 3 also demonstrates the presence of two more weak signals, one at a time corresponding to 3 half-chips relative delay and the other at 11 half-chips relative delay. Both of these signals may be tested for the time-of-arrival of a direct signal. A typical case of twin-peak behavior from the same SPS satellite signal occurs when an SPS receiver receives both a reflected signal and a direct signal from the same SPS satellite signal, and both signals are relatively strong and above the signal detection level. Normally, the direct signal produces an earlier correlation peak (e.g. time≈about 6, y≈about 4500 as shown in FIG. 3) and the reflected signal produces a later correlation peak (e.g. time=about 8.5, y≈about 6500 as shown in FIG. 3). In certain circumstances (e.g. an SPS satellite which is low along the horizon), the reflected signal may be a stronger signal than the direct signal; FIG. 3 shows this example.

Another type of interference, referred to as cross-correlation, can also exist and can occur when a strong SPS satellite signal interferes with the processing of a weaker signal; examples of methods for mitigating this interference is described in copending U.S. patent application Ser. No. 09/109,112 filed Jul. 2, 1998.

Figure 4:
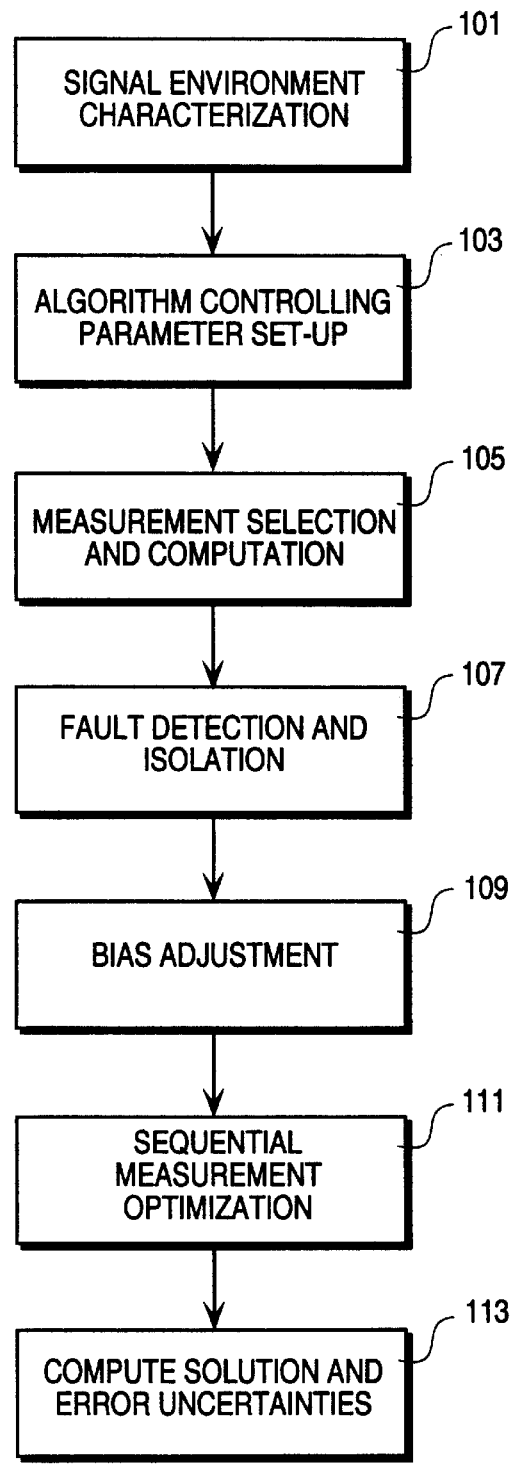
FIG. 4 is a flowchart which outlines the major operations performed by GPS receiver 20, or other types of GPS receivers, or a combination of a mobile GPS receiver and a data processing system such as a server computer system, in processing received satellite signals to produce a location fix, according to a measurement processing method of an embodiment of the present invention.

FIG. 4 is a flowchart which outlines the major operations performed by GPS receiver 20 in processing received satellite signals to produce a position information according to a measurement processing method of an embodiment of the present invention. The measurement processing method illustrated in FIG. 4 includes seven main processes. In operation 101, the signal environment of the GPS receiver location is characterized. Empirical data indicates that signal characteristics, such as various measures of signal strengths, pseudorange and multipath errors, vary significantly from one environment (e.g. an urban canyon) to another (e.g. indoors). This is largely due to the fact that the material, height and spatial distribution of buildings in different urban environments influence the paths that the satellite signals traverse on the way to GPS receiver's antenna. The signal environment data represents a manner in which SPS signals are propagated to an SPS antenna at the particular location.

Characterizing the cellular site with which GPS receiver 20 is communicating in terms of its signal environment can aid in the algorithm selection for measurement processing. This information may be available as part of the cell object information. In addition to the cell signal classification, the cell object information may also contain the cell service area, cell site identification, cell site location and estimated altitude. The classes of signal environments can be defined as "open sky", "rural", "urban", "urban canyon", and so on. The "urban canyon" may be sub-classified by the actual city or metropolitan area, such as "urban canyon of Tokyo" or "urban canyon of San Francisco" to further accurately define the environment. For example, "urban canyon of Minneapolis" implies flat terrain, whereas "urban canyon of San Francisco" indicates hilly terrain with possible significant variations in altitudes.

In a typical embodiment of the invention, a characterization of the signal environment is performed each time an SPS receiver is operated in a location without reference to prior analysis of a signal environment for the same location. However, it is possible to use a prior analysis of the location's signal environment, and this prior analysis may be considered a set-up step. The signal environment of a location, such as the location of a cell site or a typical location of a cellular telephone in the cell area serviced by the cell site, may be characterized in a set-up step (as a prior analysis) by taking several measurements at the location (or several "representative" locations in the area covered by the cell site). Since satellites move around, the empirical data may be valid only at specific times. The above measurements can be repeated at different times of day or around peak usage time. These measurements are analyzed empirically to determine the typical signal strengths and typical peak-widths (e.g. SNR Out and/or SIR Out, and/or peak-width as shown in FIG. 2), interference patterns and presence of multipath errors. Since the location (or representative locations) is (are) known when performing the set-up characterization, the correlation outputs from the satellite signals may be compared to the expected correlation outputs, and this comparison will show the magnitude of reflections (e.g. a reflected signal) and the presence of twin-peaks in the signal environment. In another example, the RMS (root mean squared) difference of the correlation outputs and nominal values may be analyzed for multipath errors. Also, actual knowledge that most or all of a cell site's coverage is urban or rural may be included in the signal environment data. Once the characterization is completed, the data characterizing the signal environment may be stored in a database (e.g. a cell based database) in which the location (e.g. a cell site identifier or other identifiers of the location of the cell) is associated in the database with this data characterizing the signal environment. FIG. 12A shows an example of this database which may be maintained at an SPS server. In the operation of one embodiment of the invention, a mobile cellular telephone/GPS receiver (e.g. receiver 901b) provides pseudoranges and correlation outputs (used for measurement processing) which are transmitted to the cell site (e.g. cell site 901a). The cell site then forwards this data to an SPS server (e.g. server 912) which, in turn, determines the signal environment (e.g. by receiving an identifier of the cell site in a cellular radio communication and looking in the database (e.g. database 912a) for the signal environment data associated with the location of the cell site). The data representing the signal environment is then used to process, according to various embodiments of the invention, the pseudoranges and correlation outputs received from the mobile cellular telephone/GPS receiver (e.g. receiver 901b). This data for the signal environment may be supplemented by dynamically obtained signal environment measurements which are made in actual use of the system after these set-up characterizations. However, the set-up characterizations may provide aiding information; for example, in certain cells of a cellular telephone network, most of the cell will be urban or rural, and this information may be forwarded to the mobile SPS receiver and used at the mobile SPS receiver as part of the signal environment classification.

In one embodiment of the present invention, the environment classification obtained in operation 101 is used to aid in the algorithm controlling parameter selection of operation 103. The controlling parameters set-up in operation 103 typically include masks for signal-to-noise ratio, signal-to-interference ratio, peak-width, HDOP, satellite elevation, and other such parameters. These controlling parameters are used in the measurement selection and computation process, operation 105. Based on the parameter mask values, measurement selection is performed. As part of operation 105, some measurement computation is also performed. For example, input signal-to-noise ratio is estimated from the measured (output) signal-to-noise ratio, measurement integration period (defined in terms of number of predetection integrations and post-detection integrations), and Doppler error.

Based on the parameter selection of operation 103, some measurements may be identified as potential cross-correlations. In operation 105, a test is performed to determine if the receiver generated code phase measurement is a cross-correlation peak rather than a true signal.

Measurements that successfully pass operation 105 are then used by a fault detection and isolation (FDI) process of operation 107. The fault detection and isolation process serves to isolate (i.e., identify) any errant satellites so that they may be corrected or removed from the solution. The prerequisite for fault detection and isolation is an overdetermined solution where the number of measurements exceeds the number of unknowns.

If there is an error (bias) in the pseudorange measurement, a bias adjustment process is performed, operation 109. In one embodiment, the bias adjustment process first performs bias estimation and then bias adjustment. This step may also include correction of pseudorange measurement with the bias estimate.

In operation 111, a sequential measurement optimization (SMO) process is used to improve a selected error statistic. The error statistic that is used may be influenced by the signal environment characterization of operation 101. The sequential measurement optimization process analyzes a subset of solutions one measurement at a time, and selects the solution that has the best error statistic. For example, if there are n measurements and only one error, the sequential measurement optimization process may consider the n subset solutions obtained by omitting (deweighting) one satellite at a time from the initial set. Instead of satellite removal, in an alternative embodiment of the present invention, satellite measurements are adjusted by an error estimate computed in operation 109. In this manner, the sequential measurement optimization process analyzes all possible subsets to achieve the best solution. In yet another embodiment, the bias adjustment may be performed as part of a sequential measurement optimization process.

Position and velocity are computed in operation 113. In addition, the error statistics such as unit variance, estimated horizontal error, weighted HDOP, error ellipse and its orientation are also computed.

A detailed description of individual operations within each of the main processes of FIG. 4 will be provided in the sections that follow.

Signal Environment Characterization

Figure 5:
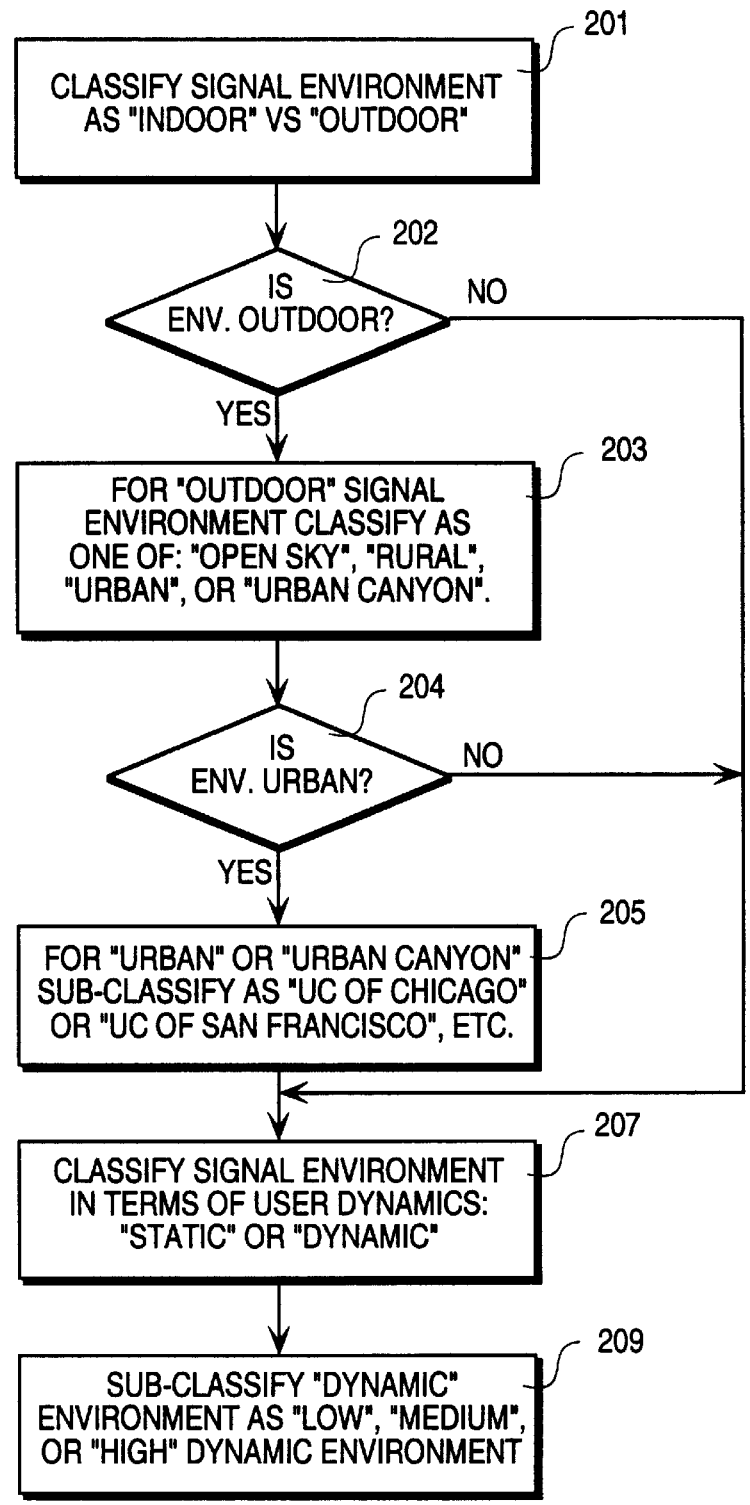
FIG. 5 is a flowchart that outlines operations included in the signal environment characterization process illustrated in FIG. 4, according to one embodiment of the present invention.

FIG. 5 is a flowchart that outlines the operations included in the signal environment characterization process illustrated as operation 101 in FIG. 4, according to one embodiment of the present invention. Identifying or ascertaining the signal environment of the GPS receiver is important for attaining maximum flexibility for different applications and supporting various performance levels.

In operation 201, the signal environment is classified as "indoor" or "outdoor". In one embodiment of the present invention, this information is provided to the GPS receiver through user input. In an alternative embodiment, this information may be derived from available GPS-based measurements. For example, the distribution of signal-to-noise ratio and/or signal attenuation and the satellite line-of-sight information (azimuth and elevation angles) may indicate an indoor environment as opposed to an outdoor environment. Signal attenuation is computed as the difference between the measured input signal level and the expected input signal level. The expected signal level is the signal level that is received for an unobstructed direct satellite signal for a given combination of elevation and azimuth angles. The expected input signal level is determined as a function of Doppler error and total integration period. A GPS receiver's antenna gain pattern may be used to adjust the expected signal level.

For example, the signal environment may be identified as "indoors" if the signals for all satellites in-view are attenuated by a specified threshold level. The presence of short multipath errors (<30 m) on all or a majority of satellites is also indicative of an indoor environment. In another example, where at least one of the higher elevation satellite signals exhibits higher levels of attenuation than signals from satellites which are lower in the sky, the signal environment may also be identified as "indoors." The presence of peak-width deviation, generally in the form of wider peaks, on all or a majority of satellites is also indicative of an indoor environment. Under certain signal conditions, such as out-of-phase signal combinations, the resulting peak widths may be narrowed as a result of multipath signal presence.

In an alternative embodiment of the present invention, signal levels from cellular outbound transmission, such as from basestation to handset, are used to aid the signal environment determination. In a manner similar to that described above for the GPS satellite signals, signal attenuation measures of the cellular or wireless radio signals may be used to aid the determination if the combined GPS receiver such as GPS receiver 20 is being used inside or outside.

In operation 202, it is determined whether the signal environment is "outdoors." If the signal is determined to be indoors, the processing proceeds to operation 207, thereby skipping operations 203–205. Optionally, the processing may skip operations 203–209 because it is not likely that an indoor environment will have a dynamic characteristic (although if it does, this suggests that the characterization as indoor may be erroneous and signal environment may be re-characterized as "outdoors"). If the environment is outdoor, the environment is further sub-classified as either "open sky", "rural", "urban" or "urban canyon" in operation 203. In one embodiment of the present invention, these sub-classifications are determined by further analyzing the signal attenuation and pseudorange error characteristics of the GPS signals. For example, if the GPS sensor is able to acquire and track signals from all satellites in-view and these signals exhibit direct signal behavior with little or no multipath, then the environment is declared as an "open sky" signal environment.

For operation 203, the combination of the signal attenuation/signal blockage information is used to determine the type of "urban" environment. For example, in the urban environment where the buildings are assumed 20 meters apart, a 30° satellite visibility mask is equivalent to being surrounded by 6-meter tall buildings. Satellite visibility mask information is derived from either total signal blockage or signal attenuation of a specified level. For instance, the signal environment with direct signals received exclusively above 60° elevation mask may be declared as an "urban canyon" signal environment. A typical urban signal environment is where the satellites are masked by buildings in one direction but with better visibility present in the perpendicular direction. Pseudorange measurements with large multipath errors (>100 m) are also indicative of urban canyon environments. In many cases, the presence of multiple peaks or deviations in peak shapes is also indicative of urban canyon environments.

In operation 204, it is determined whether the outdoor signal environment is urban or urban canyon, instead of open or rural. If the outdoor signal is classified as an "urban" or "urban canyon" environment, the environment is further classified by identifying it by its metropolitan area or city name, operation 205. For example, an urban canyon environment may be specified as either an "urban canyon of Chicago" or an "urban canyon of San Francisco". As stated previously, the actual city environment may have a significant impact on the reception of GPS signals depending on the topography of the city or the nature and type of the buildings surrounding the GPS receiver.

In one embodiment of the present invention, this information is derived from the cell object information. In another embodiment, this information is provided by the user input. Alternatively, it may be derived from the initial GPS position solution. An initial fix, unaided by specific urban canyon information, is typically accurate enough to serve as a database lookup for urban canyon identification. In an alternative embodiment, initial position information may be derived in conjunction with other location methods, such as terrestrial radiolocation using wireless signals as ranging measurements. Computer models for satellite line-of-sight and signal strength expectations may be available and/or developed for specific urban canyon environments. Parameters modeled may include distribution of building heights, street widths, street intersections, satellite visibility and masking due to surrounding building, possible reflections and corresponding multipath errors. The models may be self-learning, such as through the use of artificial intelligence, to incorporate data made available with every location fix. Standard models may be employed first to facilitate the analysis. An example of such model may be an urban model where, within a five mile radius, 60% of all buildings are 20-story buildings and the average street width is about 60 feet. In the area between 5 and 20 miles from the center, 20% of all buildings are 8-story buildings and the average street width is 80 feet. In the area between 20 and 40 miles from the center, 35% of all buildings are single-story buildings and the average street width is about 100 feet. The urban model may improve with every position fix by getting updated and refined with corresponding GPS-based information.

In operation 207 the user dynamics of the GPS receiver is identified. Typical portable GPS receivers, such as the combined GPS receiver illustrated in FIG. 1 may be used in mobile (dynamic) applications or stationary (static) applications. In one embodiment of the present invention, identification of the user dynamics is accomplished by user provided input. In another embodiment, this information may be derived from the initial GPS-based velocity solution. In yet another embodiment, user dynamics may be derived by alternative radiolocation methods. Alternatively, the user dynamic information is determined by relying on previous solution information or by using the urban canyon model and the particular application to set the expected levels. For example, in Automatic Vehicle Location applications, the standard urban model may include the expected average vehicle speeds such as 20 mph within a 5-mile radius, 35 mph within a 20-mile radius and 50 mph within a 40-mile radius. This model may be updated with every velocity solution. It also may be aided by the database of maximum allowable speeds for a particular street of a particular city.

In operation 209 the "dynamic" environment is further sub-classified as either "low," "medium" or "high" dynamic environment. The sub-classification of the dynamic environment provides speed of travel information to the GPS receiver. In one embodiment of the present invention, the dynamic sub-classification information of operation 207 is provided by user input to the GPS receiver. In an alternative embodiment, this information is determined on previous solution information (such as velocity and acceleration), or by using the urban canyon model and the particular application to set the expected levels. In vehicle tracking applications, for instance, additional sensor (such as speedometer and gyroscope) inputs may be used to provide initial velocity estimates or velocity and/or heading information for further integration with GPS data.

Algorithm Controlling Parameter Setup

Figure 6:
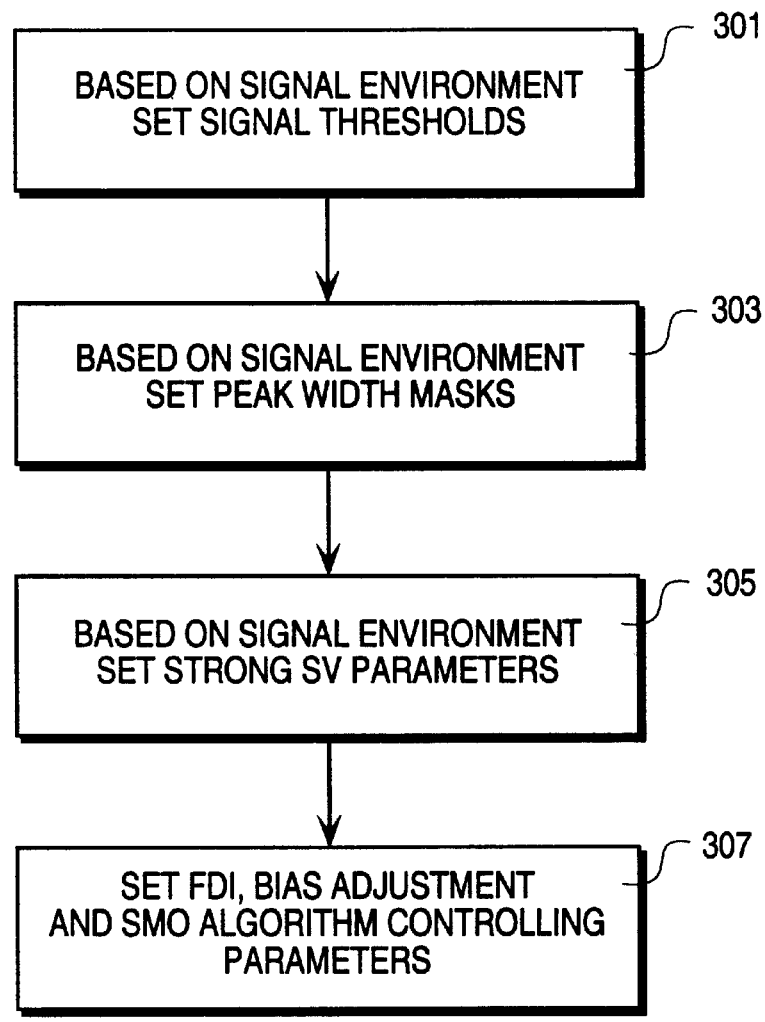
FIG. 6 is a flowchart that outlines operations included in the algorithm controlling parameter setup process illustrated in FIG. 4, according to one embodiment of the present invention.

FIG. 6 is a flowchart that outlines the operations included in the algorithm controlling parameter setup process illustrated as operation 103 in FIG. 4, according to one embodiment of the present invention. An initial selection of signal thresholds is performed in operation 301. In one embodiment, this initial selection is based on the signal environment determination of operation 101, as illustrated in the flowchart of FIG. 5. The signal thresholds selected in operation 301 include minimum signal-to-noise (SNR) and signal-to-interference (SIR) ratios. For example, if the urban canyon of San Francisco is used as an illustrative signal environment, the minimum signal-to-noise and signal-to-interference ratios are set to 15.5 and 14.5 dB respectively. These thresholds are used in the satellite measurement selection of operation 105.

In operation 303, peak-width parameters are set. These parameters are used in the satellite selection and a cross-correlation check performed during the measurement selection and computation process of operation 105. In one embodiment of the present invention, peak-widths for all satellites are computed at a selected signal-to-noise or signal-to-interference ratio level. For example, peak-widths may be computed at a signal level which is 3 dB below the signal level of the punctual correlator. The correlator function illustrated in FIG. 3 demonstrates the punctual correlator output located at a sample with a relative time delay of eight half-chips. The peak-width for this particular correlator peak is computed to be 1.02 half-chips. In general, the peak-width, the peak-width deviation, and the shape of the correlator function are indicative of the multipath present in the signal. For example, the wider the peak, the larger the multipath error. Therefore, the peak-width mask may be used in the satellite measurement selection of operation 105. In addition, the shape of the correlator function may indicate the presence of multiple signals. For example, the correlator function of FIG. 3 demonstrates the presence of two earlier signals. Also, an inclination point at a sample with a relative time delay of 5 half-chips may indicate the presence of one more signal. In most cases, cross-correlated signals exhibit wider peaks. This allows peak-width measurements to be used in the identification of potential cross-correlated signals during the measurement selection and computation process (operation 105 in FIG. 4).

In operation 305, a "strong" satellite is defined. A "strong" satellite is a characteristic of a satellite measurement that is least likely to be affected by multipath errors. In one embodiment of the present invention, the parameters that are used in "strong" satellite identification are satellite elevation, peak-width deviation, signal-tonoise ratio, signal-to-interference ratio, signal attenuation and input signal strength. For the urban canyon of San Francisco example, the elevation mask may be set at 20° and the signal input strength set to −135 dB. Alternatively, for a different city environment, such as the urban canyon of San Jose, the signal input strength may be set to −130 dB.

A satellite elevation mask, unrelated to the "strong" satellite definition, is also set in operation 305. This mask may be used in the satellite selection step of the measurement selection and computation process. In the "open sky" signal environment this elevation mask may be set to a low value, such as 5°, since only small multipath errors are expected. However, in the "urban canyon" environment the elevation mask may be raised to as much as 15° to avoid processing satellites that are potentially affected by large multipath errors.

The flow of a state machine that executes the fault detection and isolation (FDI), bias adjustment (BA) and sequential measurement optimization (SMO) algorithms may be controlled by the parameters that are set in operation 307. For example, depending on the signal environment characterization and the probability of missed cross-correlation detection, the order in which fault detection and isolation, bias adjustment, and sequential measurement optimization calculations take place may be modified. For instance, in the "open-sky" environment where the probability of missed cross-correlation is low, bias adjustment may not be performed at all or performed before fault detection and isolation. In another example, altitude aiding measurements may be included or excluded from the fault detection and isolation, bias adjustment, and sequential measurement optimization algorithms. An error estimate associated with altitude aiding measurement may be set based on the signal environment characterization of operation 101. For instance, for an "indoor" environment, altitude aiding may be disabled or the altitude error may be set to a large value (like 50m) to indicate lack of confidence in the source of altitude information which in one embodiment could be a terrain elevation database. In another example, a "strong" satellite as defined by controlling parameters may differ between FDI, Bias Adjustment and SMO algorithms.

Measurement Selection and Computation

Figure 7:
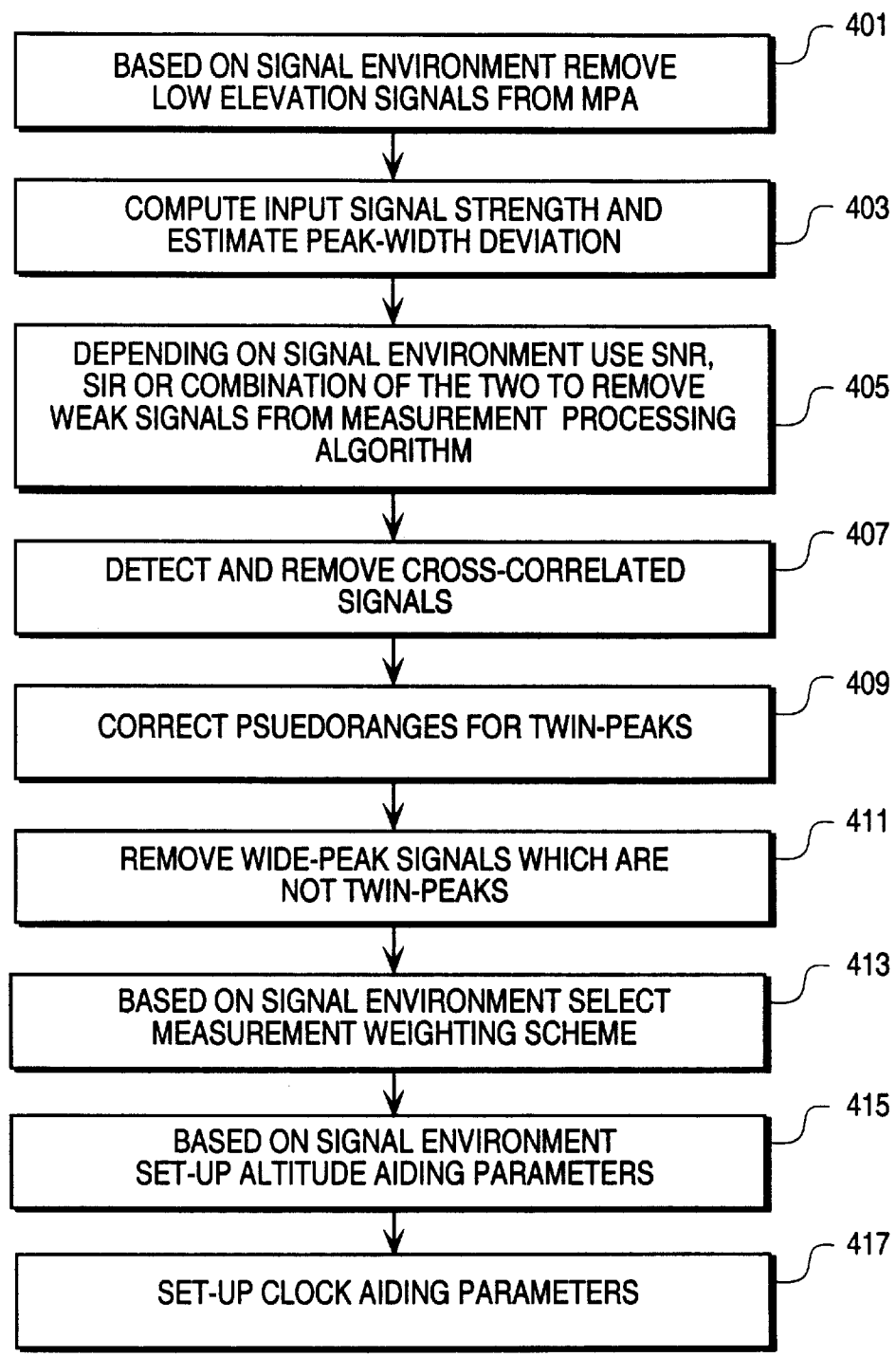
FIG. 7 is a flowchart that outlines operations included in the measurement selection and computation process illustrated in FIG. 4, according to one embodiment of the present invention.

FIG. 7 is a flowchart that outlines the operations included in the measurement selection and computation process illustrated as operation 105 in FIG. 4, according to one embodiment of the present invention. The measurement selection and computation process serves to pre-filter location fix measurements and to compute parameters required for further GPS signal processing using a measurement processing method of the invention.

In operation 401, the low elevation satellites are removed from further measurement processing. The elevation masks may be set according to the signal environment characterization process illustrated in FIG. 5 and controlling parameter set-up illustrated in FIG. 6. In operation 403, an estimated input signal strength is computed based on the measured output signal-to-noise ratio, measurement integration period, and Doppler error. The input signal strength is then used to calculate the peak-width deviation and signal attenuation. Peak-width deviation is computed as the difference between the measured peak-width and the expected peak-width for a satellite signal with a given input signal strength. Depending on the signal environment characterization, the signal-to-noise ratio mask or signal-to-interference ratio mask or estimated signal input strength or a combination of the three masks is used in operation 405 to remove weak signals from further measurement processing. In one embodiment, the signal thresholds are set as described with relation to operation 301 in the algorithm controlling parameter setup process of FIG. 6.

Cross-correlated signals are detected and removed in operation 407. Cross-correlated signals generally exhibit wider peaks and high noise-to-interference ratio (NIR). Cross-correlations take place in high-dynamic signal environment when a strong satellite signal cross-correlates with a weak satellite signal. In general, both "indoor" and "urban canyon" environments tend to produce a significant number of cross-correlated signals. The SNRs, SIRs, and the estimated input signal strengths for strong and weak satellite couples may be examined (and typically are examined) for significant signal separation. In one exemplary embodiment involving an urban canyon situation in San Francisco, an 18 dB difference is searched for. Cross-correlations are then verified by examining the relative code phases and Dopplers of the strong and weak satellite couples.

Under certain receiving conditions, the correlation peak waveform may exhibit a twin-peak signal with two dominating peaks. The waveform of FIG. 3 illustrates such a twin-peak signal. A twin-peak signal is a special case of multiple peak signal which is the result of a combination of multiple signals incident simultaneously on a GPS antenna. In operation 409, the correlation peak function, such as the waveform of FIG. 3, is analyzed for presence of twin-peaks. For example, the signal corresponding to the maximum correlation peak of FIG. 3, was received about 1 microsecond later than an earlier signal. Since, the reflected signal always travels a longer path than the direct signal, the main peak corresponds to a reflected signal and the earlier peak corresponds to the direct signal. In this example, a correction may be applied to the pseudorange (code phase) measurement to account for the presence of the multipath signal. Typically, this correction selects the earlier peak as the correct correlation output for this signal from an SPS satellite. In the case where a mobile SPS receiver performs some measurement processing techniques of the invention (e.g. identification of the existence of twin-peaks) and an SPS server performs other measurement processing techniques (e.g. FDI), the mobile receiver may transmit an indication that twin-peaks exist for a particular satellite. In another example, it may also transmit the relative locations of all identified peaks in the correlation peak function with respect to the prompt correlator (e.g. sample 8 in FIG. 3). In yet another example, the mobile receiver may transmit a set of samples of the correlation peak function. This data may be used by a bias adjustment algorithm and/or an SMO algorithm to process potential time-of-arrival candidates in order to correct pseudorange measurements as described in operations 601 and 703. In operation 411, if a wide-peak is detected and it does not belong to a twin-peak, this signal is either corrected or removed from further measurement processing.

Based on the signal environment, a weighting scheme is selected in operation 413. Weights represent a priori error uncertainties in pseudorange measurements. For instance, a weight of 0.1 corresponds to an error estimate of 10 meters. Weights may be derived from a variety of parameters including signal-to-noise ratio, signal-to interference ratio, noise-to-interference ratio, input signal strength, signal attenuation, elevation angle, measurement integration period, peak-width, peak-width deviation, and so on. A weight for a particular satellite measurement may be adjusted if a twin-peak was detected for that satellite signal. A weight may also be adjusted if the measurement is not differentially corrected or the correction is too old (e.g., a correction age greater than 30 seconds) to account for the presence of a Selective Availability error. Error estimates may be improved by incorporating signal environment measurements made available through a system set-up characterization, which may be performed as part of signal environment characterization in operation 101. Weighting may also be improved if additional information is available. For instance, in an "urban canyon" environment an error estimate may be further improved by an external source of reflection information available from the continually updated urban computer model, such as the relative location of surrounding buildings.

In an outdoor signal environment, altitude aiding may be used to improve the accuracy of measurement processing algorithm in operation 415. Altitude aiding improves the geometry of the solution and provides an extra measurement necessary for the under-determined case. If an estimated altitude is available (e.g. an average altitude for a cell site), this may be used as an altitude aiding parameter. Altitude aiding will also improve as the vertical terrain model improves. The fault detection and isolation, bias adjustment and sequential measurement optimization algorithms may also benefit from accurate altitude aiding.

In an indoor signal environment, altitude aiding may be applied if it is required to produce a fix as opposed to a no fix condition. In this case, the weighting reflects the uncertainty in the altitude measurement. A weight is defined as an inverse of a measurement error estimate. The altitude uncertainty may be derived from the urban computer model. For example, if the indoors environment is a 20-meter building, a weight of 0.1 may be used. Altitude aiding may be applied iteratively, where the initial fix with a large altitude uncertainty or no altitude aiding at all, may be used as a look-up in the urban computer model to derive the building height information and the corresponding altitude uncertainty. Alternatively, an external source may provide information (i.e., 10th floor) that may be used to correct the altitude derived from a terrain elevation database. In operation 417, clock aiding may be applied. Clock uncertainty may be derived from a clock model based on the quality of the internal oscillator used in the GPS receiver or the quality of the external timing signal such as the one in the CDMA network used to set the time in the GPS receiver. A clock model may be updated in real-time by clock bias and clock drift estimates derived from GPS pseudorange and Doppler measurements. If network provided timing information is very accurate (e.g. accurate to within about 1 microsecond), such information may also aid a measurement processing method of the present invention by providing an extra degree of freedom.

Fault Detection and Isolation Algorithm

Figure 8:
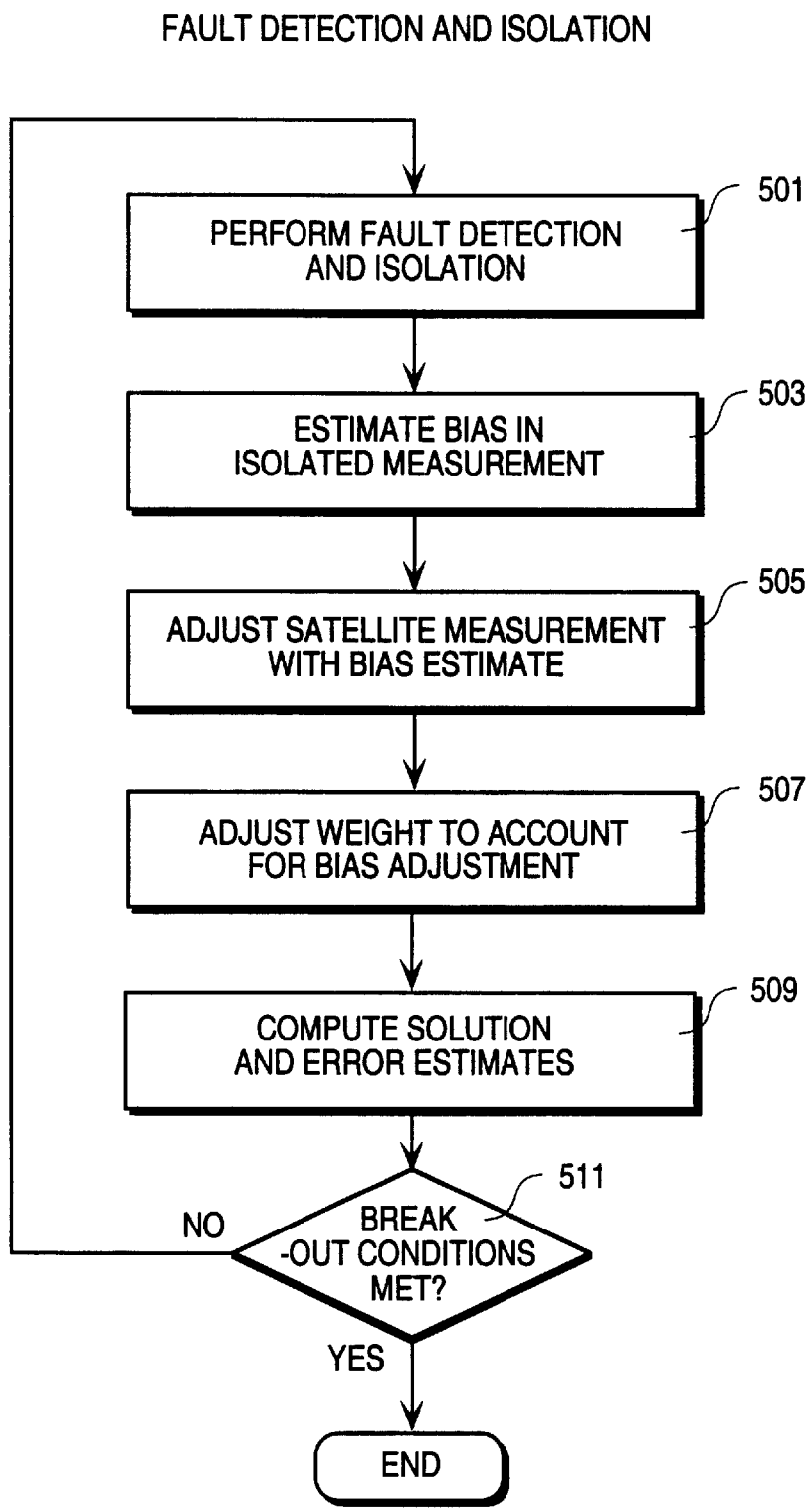
FIG. 8 is a flowchart that outlines operations included in the fault detection and isolation process illustrated in FIG. 4, according to one embodiment of the present invention.

FIG. 8 is a flowchart that outlines the operations included in the fault detection and isolation (FDI) process illustrated as operation 107 in FIG. 4, according to one embodiment of the present invention.

In one embodiment of the present invention, the fault detection and isolation process is performed as part of a Receiver Autonomous Integrity Monitoring (RAIM) function within the GPS receiver. In another embodiment of the invention, the fault detection and isolation process is performed at an SPS server using the position information received from the GPS receiver. A variety of RAIM schemes have been proposed, and all are based on some type of self-consistency check among the available measurements. Some of the better known error detection methods are range comparison, least-squares-residuals, and parity, among others (see R. Grover Brown, "Global Positioning System: Theory and Applications", Volume II, Chapter 5). In one embodiment of the present invention, the fault detection and isolation process is an extension of a failure detection problem, where the integrity system may also attempt to isolate the errant satellite measurement so that it can be removed from the navigation solution.

In operation 501, fault detection and isolation takes place. In one embodiment of the present invention a parity method is used. (See Mark Sturza, "Navigation System Integrity Monitoring Using Redundant Measurement", Navigation). As part of fault detection and isolation, an F-test is performed to ascertain reliability of the isolation. Depending on the signal environment and isolation reliability, if a "strong" satellite is isolated as an errant satellite, control may be passed to bias adjustment and sequential measurement processing algorithms without any further fault detection and isolation processing. Also, if the fault detection and isolation process is altitude aided, again based on altitude aiding parameters, and if the altitude measurement is isolated, control may be passed to the bias adjustment and sequential measurement processing algorithms without any further processing by the fault detection and isolation process. For example, if a solution computation takes place under "open sky" conditions with a good altitude estimate (i.e., uncertainty is small), and altitude measurement is isolated as an errant measurement, further fault detection and isolation processing may be stopped and the control may be passed to the bias adjustment and sequential measurement processing algorithms.

Otherwise, in operation 503, bias estimation in the isolated measurement is performed. In one embodiment of the present invention, using a well-known mathematical relationship between a priori and a posterior residuals of a least-squares solution, a hypothesis is made that only the isolated measurement is affected by a bias of unknown magnitude and the rest of the measurements are perfect. The bias is then solved for in a least-squares fashion. In one embodiment of the present invention, if the bias magnitude exceeds a pre-selected threshold, then the isolated measurement is declared as a missed cross-correlation and de-weighted appropriately.

Based on the signal environment and number of degrees of freedom, the isolated measurement may be bias adjusted or de-weighted. Number of degrees of freedom is defined as the difference between total number of measurements and the number of unknown parameters being solved for. Depending on the weighting factor, de-weighting may be considered equivalent to measurement removal from the solution. In operation 505, the measurement is bias adjusted. In this manner, the measurement is corrected by the bias estimated in operation 503. In one embodiment of this invention, the measurement is bias adjusted only if bias is positive.

In operation 507, a new weight for the adjusted measurement is computed. The new weight may be based on the signal environment, isolation reliability, bias magnitude, presence of multiple peaks in the satellite measurement, and other such factors.

A new solution and corresponding error estimates are calculated in operation 509. In operation 511 it is determined whether any of a pre-defined set of break-out conditions are triggered. In one embodiment of the present invention, the break-out conditions include HDOP exceeding the HDOP mask, the estimated horizontal error exceeding a pre-selected threshold, the unit variance falling below a pre-selected threshold or exceeding a second pre-selected threshold, a change in the solution before and after isolation being below the pre-selected threshold or exceeding a second pre-selected threshold, fault isolation failing a reliability test, number of degrees of freedom being below a pre-selected threshold, and other such factors. If, in operation 511 it is determined that none of the break-out conditions are triggered, the entire fault detection and isolation process is repeated again from operation 501. Otherwise, the fault detection and isolation process ends.

Bias Adjustment Algorithm

Figure 9:
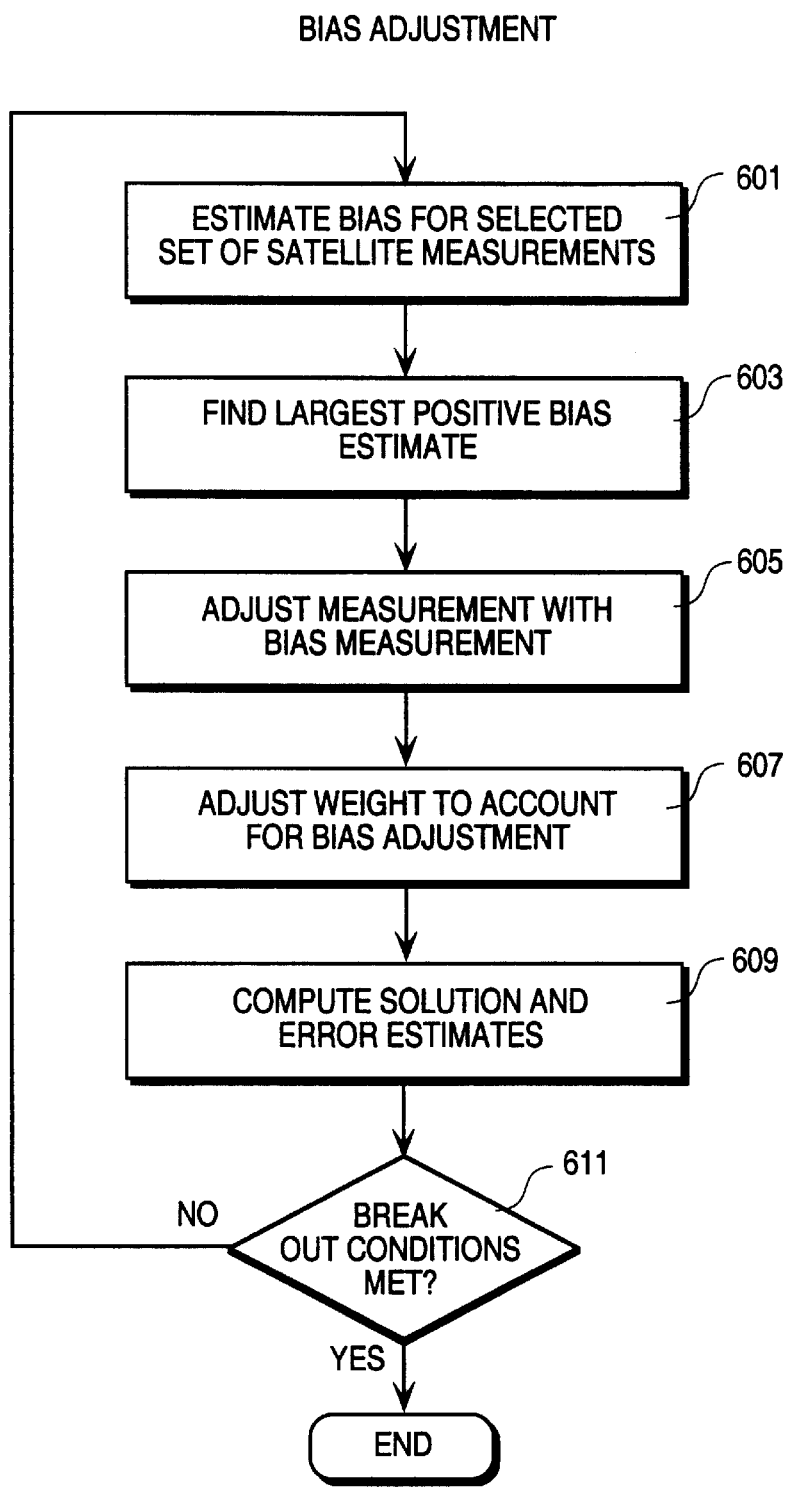
FIG. 9 is a flowchart that outlines operations included in the bias adjustment process illustrated in FIG. 4, according to one embodiment of the present invention.

FIG. 9 is a flowchart that outlines the operations included in the bias adjustment process illustrated as operation 109 in FIG. 4, according to one embodiment of the present invention.

In one embodiment of the present invention, the bias adjustment algorithm illustrated in FIG. 9 is similar to the bias estimation process described in reference to operation 503 of FIG. 8. In the bias adjustment process of FIG. 9, however, bias estimation is performed for any one or any sub-set of currently received signals and not just for the detected and isolated errant measurements. In certain instances, the selected sub-set may be the entire set of measurements. In one embodiment of the present invention, the set may exclude cross-correlated signals, may exclude the "strong" satellites, and may also exclude "twin-peak" measurements. It should be noted that the definition of a "strong" satellite in the context of the bias adjustment process may be different from the definition of a "strong" satellite used in the context of fault detection and isolation algorithm. In another embodiment, the set may exclude any or all measurements that were pre-filtered out as part of measurement selection and computation in operation 105 of FIG. 4.

In operation 601, bias errors are estimated for the selected set of satellites. Depending on the signal environment and altitude aiding parameters, bias estimation may include or exclude altitude measurement. In operation 603, the largest positive bias estimate is selected. In one embodiment of this invention, the bias in the altitude measurement if altitude aiding is used may be excluded from this selection. In another embodiment of this invention, the location of any of the multiple peaks in the correlation function may be selected as a bias estimate. In one example, an earliest identifiable peak is selected. In another example, any of the inclination points in the correlation function may be selected as a bias estimate. The selected measurement is then corrected by the bias estimate, operation 605.

In operation 607, the weight of the corrected measurement is adjusted to account for bias correction. A new weight may be based on the signal environment, bias magnitude, magnitude of the corrected pseudorange residual, algorithm controlling parameters, SNR, SIR, signal input strength at the correlation function sample corresponding to the bias estimate and so on. A new solution and corresponding error estimates are calculated in operation 609.

In operation 611 it is determined whether any of a pre-defined set of break-out conditions are triggered. In one embodiment of the present invention, the break-out conditions include unit variance scaled estimated horizontal error exceeding a pre-selected threshold, the unit variance falling below a pre-selected threshold or exceeding a second pre-selected threshold, a change in the solution before and after bias adjustment being below a pre-selected threshold or exceeding a second pre-selected threshold, number of degrees of freedom being below a pre-selected threshold, and other such factors. If in operation 611 it is determined that none of the break-out conditions are triggered, the bias adjustment process is repeated from operation 601, otherwise the bias adjustment process ends.

Sequential Measurement Optimization Algorithm

Figure 10:
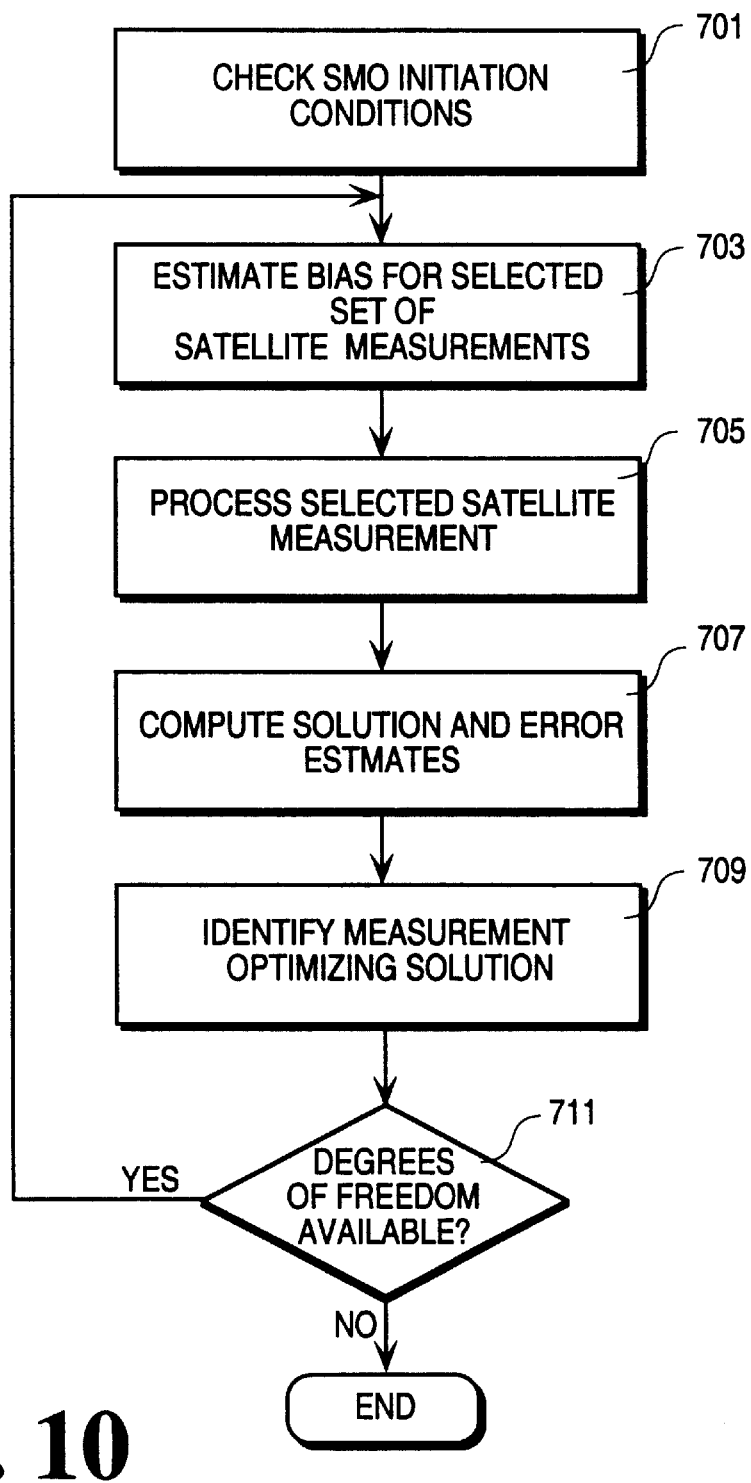
FIG. 10 is a flowchart that outlines operations included in the sequential measurement optimization process illustrated in FIG. 4, according to one embodiment of the present invention.

FIG. 10 is a flowchart that outlines the operations included in the sequential measurement optimization (SMO) process illustrated as operation 111 in FIG. 4, according to one embodiment of the present invention.

In one embodiment of the present invention, the sequential measurement optimization process is executed only if certain conditions, referred to as "initiation conditions" are met. In operation 701, initiation conditions of the sequential measurement optimization process are checked. Initiation conditions include failure of the fault detection and isolation reliability test, or isolation of a "strong" satellite or altitude measurement by the fault detection and isolation algorithm. The sequential measurement optimization process may also be initiated if an error statistic such as an estimated horizontal error exceeded a selected threshold, where the threshold selected may be based on signal environment characterization. The initial conditions may also include any of the break-out conditions of the fault detection and isolation and/or bias adjustment.

In an alternative embodiment of the present invention, one of the controlling parameters set in operation 307 of the algorithm controlling parameter setup process may be configured to force the sequential measurement optimization algorithm to always execute, instead of executing only upon occurrence of an initiation condition.

In operation 703, a bias is estimated for each of the selected satellites. In one embodiment, a selected set of satellite measurements may exclude satellites that have already been removed from a solution by prior measurement processing steps, such as through the measurement selection and computation process, the fault detection and isolation process or the bias adjustment process. The set may also exclude "strong" satellites. Again, the definition of a "strong" satellite in the context of sequential measurement optimization may be different from the definition of "strong" satellite used in the context of fault detection and isolation or bias adjustment. In an alternate embodiment, the set may include all satellites.

The selected satellite measurement is processed in operation 705, according to the selected method. The selected method may be a bias adjustment technique, a weight adjustment technique, a time adjustment technique, a multipath mitigation technique, or some other measurement optimization technique. The bias adjustment technique may use the bias estimate computed in operation 703 to correct the selected measurement and adjust the weight correspondingly to account for correction. A weight adjustment technique may de-weight the satellite measurement reducing the measurement impact on the overall solution. A time adjustment technique may adjust the satellite measurement in either direction (delaying or advancing time-of-arrival) to improve the solution. In an alternate embodiment, only advancing time-of-arrival (e.g. decrementing the time-of-arrival) may be performed as part of the time adjustment technique. A multipath mitigation technique may use the signal computer model to estimate the multipath error at a particular location and use this information in weighting the satellite measurement. In an alternate embodiment, the correlation waveforms (correlation functions) are analyzed for inflection points which signify the deviation from an ideal peak shape and may represent points where multiple signals are combined. In yet another embodiment, the correlation waveforms are analyzed for multiple peaks as possible times of arrival.

In operation 707, a new solution and corresponding error statistics are re-computed. In operation 709, a measurement that optimizes the error statistic is identified. In certain circumstances, optimizing may correspond to minimizing the error statistic. For example, a chosen error statistic may be a weighted root-sumsquared a posterior residuals. The error statistic selection may be based on signal environment characterization or an "urban canyon" computer model, or a prior information relative to a success of a particular approach in the particular signal environment. Other error statistics that may be used are un-weighted root-sum-squared a posterior residuals, weighted root-sum-squared a priori residuals, estimated horizontal error, unit variance, unit variance scaled by HDOP, among others.

In operation 711 it is determined whether there are any degrees of free available for further sequential measurement optimization. If there are any degrees of freedom still available, the sequential measurement optimization is repeated from operation 601, otherwise the sequential measurement optimization process ends. In one embodiment of the present invention, the sequential measurement optimization process may be stopped if a resultant HDOP exceeds a pre-selected HDOP mask, or if a resultant weighted HDOP exceeds a pre-selected weighted HDOP mask, if a selected error statistic falls below a pre-selected threshold level, or if a current sequential measurement optimization iteration did not result in an improvement of the selected error statistic. Any of the break-out conditions of the FDI and/or Bias Adjustment process may be used to stop the SMO process.

Final Solution and Error Estimate Computation

Figure 11:
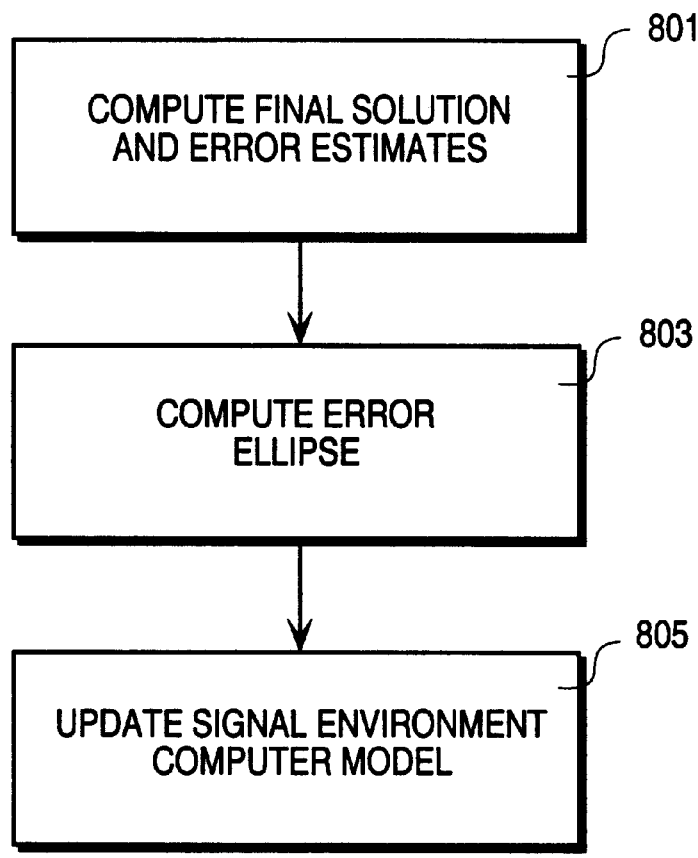
FIG. 11 is a flowchart that outlines operations included in a computation and error estimation process illustrated in FIG. 4, according to one embodiment of the present invention.

FIG. 11 is a flowchart that outlines the operations included in the final computation and error estimation process illustrated as operation 113 in FIG. 4, according to one embodiment of the present invention.

In operation 801, final solution and error estimates are computed. In one embodiment of the present invention, a solution may include at least one of position, velocity and timing information. A test may also be performed to validate the solution. In one embodiment, the test is based on the environment type, such as an "urban canyon" city model. In an alternative embodiment, in vehicle tracking applications, a solution is checked for on-street location by comparing a solution's position to its location on a digital map or other GIs (geographical information system) resource. The test checks if selected error statistics exceed pre-selected thresholds. The test may also compare this solution to the previous solution or a series of previous solutions.

In operation 803, an error ellipse is computed. The magnitude of the semi major and semi-minor axes and the orientation of the error ellipse may be analyzed with respect to the environment type. For example, in the "urban canyon" environment under severe multipath conditions, the orientation of the error ellipse should generally be perpendicular to the direction of the street. In other words, the semi-minor axis should coincide with the direction of the street.

In operation 805, the signal environment computer model is updated with the location solution information. Also, the terrain elevation database may be updated with altitude solution for outdoor signal environment.

The various methods of the present invention may be performed in part by a mobile SPS receiver and in remaining part by a remotely located SPS server. An example of a system which operates in this way is shown in FIG. 12A, and an example of an SPS server is shown in FIG. 12B.

The system 900 of FIG. 12A includes, for purposes of explanation only, four cells 901, 902, 903, and 904 serviced respectively by cellular basestations, henceforth referred to as cell sites 901a, 902a, 903a, and 904a. Each cell site provides two-way cellular radio communication with cell phones in the vicinity of the cell site in the well-known manner of cellular telephone communications. A typical cell phone may also include a mobile SPS receiver such as the receiver 901b. FIG. 1 shows a specific example of a mobile unit 20 which may be constructed to implement the integrated mobile SPS receiver and cell phone 901b. The cellular telephone in the mobile unit 901b provides radio communication to and from the cell site. This radio communication may include voice data as well as SPS aiding data or SPS position information outputs as described previously. For example, signal environment data may be provided to the cell phone which can then be used by the SPS receiver in order to perform the measurement processing techniques of the present invention. This data may be obtained from a cell based database, such as the database 912a maintained by the SPS server 912, and this signal environment data may then be used by the SPS receiver in the unit 901b to perform measurement processing techniques of the invention within the SPS receiver. Typically, the SPS receiver will receive SPS signals and determine correlation outputs from these signals for each satellite. Some of the measurement processing techniques of the present invention may then be performed within the SPS receiver and the remainder performed by an SPS server, such as the servers 914 or 912. Each mobile unit is in communication with the server through a cell site and a mobile switching center, such as mobile switching centers 906 and 907 which in turn communicate to the servers through the public switched telephone network 908 as shown in FIG. 12A. Thus, pseudoranges and correlation outputs and other measurement processing outputs generated in the mobile SPS system 901b may be forwarded to an SPS server through the cell site 901a and the mobile switching center 907 and the PSTN (public switched telephone network) 908 to the particular server, such as the SPS server 912. This SPS server then performs the remainder of measurement processing techniques according to the present invention in order to determine final pseudoranges to the various satellites in view. The position calculation is also performed using satellite ephemeris data received from a wide area reference network (WARN) 915. The determination of the final position by the SPS server may then allow the server to provide this final position information to another system, such as an application system 910, which in one embodiment may be a public safety answering point (PSAP). Further examples of systems which may be utilized with the present invention are described in co-pending U.S. patent application entitled "Distributed Satellite Position System Processing and Application Network" by inventors Norman F. Krasner, Mark Moeglein, and David Coleman, filed on Apr. 28, 1998, as Ser. No. 09/067,406. Examples of a wide area reference network are described in co-pending U.S. patent application entitled "Satellite Positioning Reference System and Method" by inventors Mark Moeglein, Leonid Sheynblat, and Norman F. Krasner, which was filed Apr. 28, 1998 as Ser. No. 09/067,407. In addition to signal environment data which may be stored in the cell based databases 912a or 914a, these databases may store average altitudes and may also store satellite related information, such as estimated Dopplers for satellites in view of the various cell sites. Examples of cell based databases of this type are described in co-pending U.S. application entitled "An Improved GPS Receiver Utilizing a Communication Link" which was filed on Apr. 15, 1997 by Norman F. Krasner as Ser. No. 08/842,559.

It should be noted that a cellular based communication system is a communication system which has more than one transmitter, each of which serves a different geographical area, which is predefined at any instant in time. Typically, each transmitter is a wireless transmitter (e.g. a cell site) which serves a cell which has a geographical radius of less than 20 miles, although the area covered depends on the particular cellular system. There are numerous types of cellular communication systems, such as cellular telephones, PCS (personal communication system), SMR (specialized mobile radio), one-way and two-way pager systems, RAM, ARDIS, and wireless packet data systems. Typically the predefined different geographical areas are referred to as cells and a number of cells are grouped together into a cellular service area, and these number of cells are coupled to one or more cellular switching centers which provide connections to land based telephone systems and/or networks. Service areas are often used for billing purposes. Hence, it may be the case that cells in more than one service area are connected to one switching center. Alternatively, it is sometimes the case that cells within one service area are connected to different switching centers, especially in dense population areas. In general, a service area is defined as a collection of cells within close geographical proximity to one another. Another class of cellular systems that fits the above description is satellite based, wherein the cellular basestations are satellites that typically orbit the earth. In these systems, the cell sectors and service areas move as a function of time. Examples of such systems include the Iridium, Globalstar, Orbcomm and Odyssey systems.

Figure 12B:
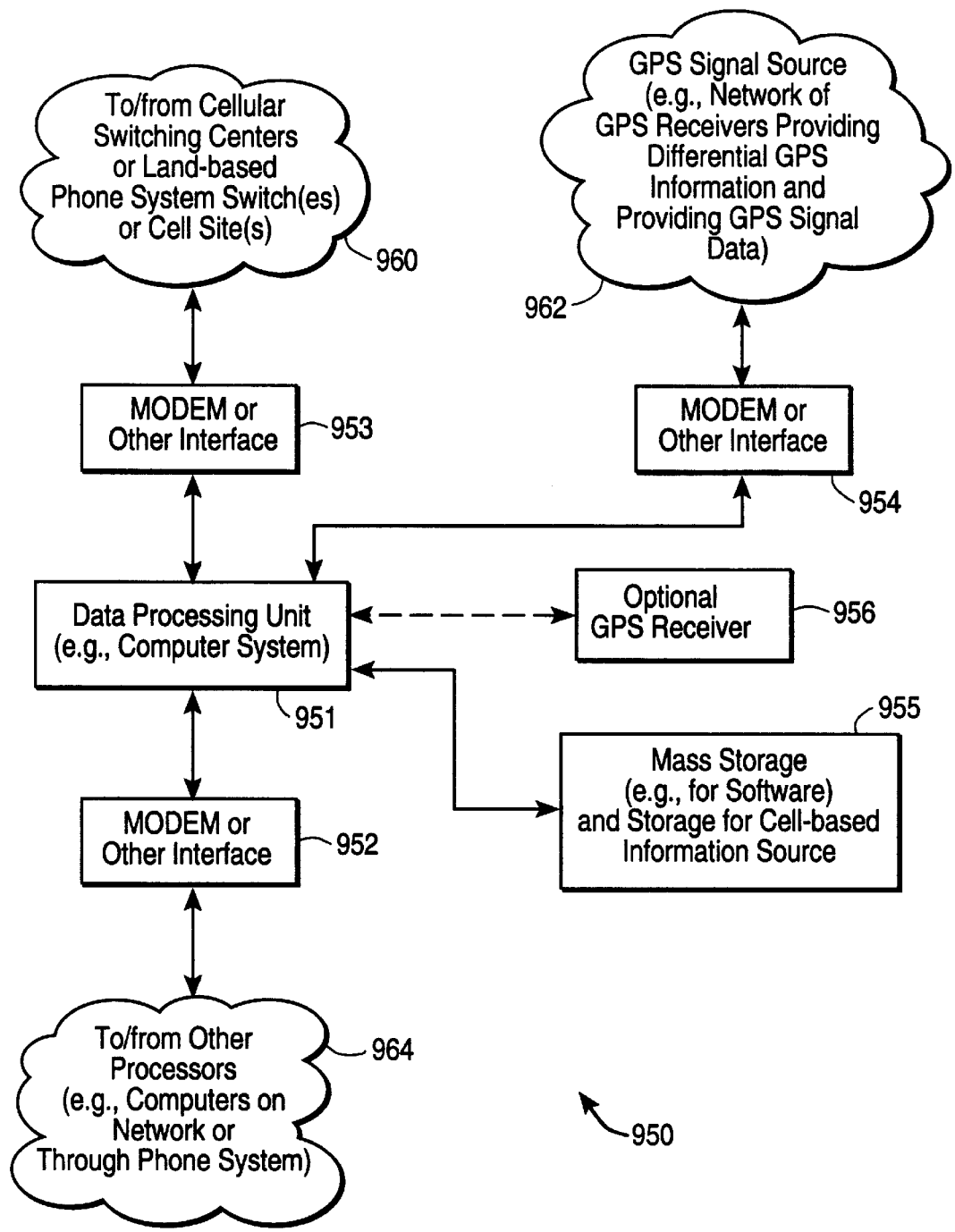
FIG. 12B is an example of an SPS server according to one embodiment of the invention.

FIG. 12B shows an example of an SPS server according to one embodiment of the present invention. This server includes a data processing unit 951 which is coupled to a modem or other interface 953 and is also coupled to a modem or other interface 952 and is coupled to another modem or interface 954. In addition, a mass storage unit 955 is coupled to the data processing unit 951. An optional GPS receiver 956 may also be coupled to the data processing unit 951. The mass storage 955 includes executable computer programs for performing the processing operations of the present invention and also include storage for a cell based information source such as the cell based database 912a which associates a location within a cell site to a particular signal environment data as described herein. Each modem or other interface provides an interface between the data processing unit 951 and the various components of the system 900 shown in FIG. 12A. For example, the modem or other interface 953 provides a connection from the cellular switching centers, such as mobile switching center 907 and the unit 951 in the case where the SPS server is directly coupled to a mobile switching center. As shown in FIG. 12A, the link between the mobile switching center is through the public switched telephone network and thus the interface 953 couples the servers 912 and 914 to the public switched telephone network. In yet another embodiment, each cell site may include a server system and thus the interface 953 couples the data processing unit 951 directly to a cell site, such as cell site 901a. Interface 952 couples the unit 951 to other systems, such as the application system 910 shown in FIG. 12A. The interface 954 couples the unit 951 to a GPS signal source such as the WARN 915 shown in FIG. 12A.

In the foregoing, a system has been described for measurement processing of navigational data in a SPS system such as a GPS receiver. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than restrictive sense.

What is claimed is:

1. A method of measuring times of arrival of satellite signals received in a Satellite Positioning System (SPS) receiver, said method comprising:
   receiving a plurality of SPS signals from a plurality of SPS satellites;
   characterizing a signal environment corresponding to the location in which said SPS receiver is located, to produce environment data which represents a manner in which SPS signals are propagated locally to said location;
   measuring times of arrival of respective satellite signals from two or more satellites of said plurality of satellites; and
   processing data representing said times of arrival using said environment data to produce a set of times of arrival with which to calculate a location fix for said SPS receiver.

2. The method of claim 1 wherein said environment data comprises at least one of a signal-to-noise ratio, a signal-to-interference ratio, an input signal strength, a signal attenuation, a correlation function waveform, and a peak-width value of a signal of said plurality of signals.

3. A method as in claim 1 wherein SPS signals are propagated locally to said location when said SPS signals are within about 1000 meters of said location.

4. A method as in claim 3 wherein said characterizing comprises determining whether said signal environment resembles an indoor environment or an outdoor environment.

5. A method as in claim 3 further comprising:
   identifying one or more errant SPS signals;
   correcting time-of-arrival measurements performed by said SPS receiver as a result of identifying one or more errant SPS signals.

6. A method as in claim 3 wherein said SPS receiver is included within a combination receiver and radio communication device, said combination receiver comprising a digital processor configured to process said data representing said times of arrival using said environment data.

7. A method as in claim 6 wherein said radio communication device is a cellular communication system which processes a cellular communication signal and wherein said characterizing comprises determining a signal parameter of said cellular communication signal.

8. A method as in claim 3 wherein said set of times of arrival are transmitted to a basestation over a communication link.

9. A method as in claim 3 further comprising:
   determining a first possible correlation peak for a first set of SPS signals from a first SPS satellite;
   determining a second possible correlation peak for said first set of SPS signals;
   transmitting from said SPS receiver which received said first set of SPS signals an identification that said first and said second possible correlation peaks have been determined.

10. A method as in claim 3 wherein a time-of-arrival measurement of said set of times of arrival is corrected with a bias adjustment based on said signal environment.

11. A method of determining a position of a Satellite Positioning System (SPS) receiver, said method comprising:
    receiving an SPS signal from an SPS satellite;
    determining at least a selected one of a peak-width value of a correlation output of said SPS signal or a signal-to-interference ratio (SIR) of said SPS signal;
    determining said position of said SPS receiver using said selected one of said peakwidth value or said SIR.

12. A method as in claim 11 further comprising:
    identifying one or more errant SPS signals;
    correcting time-of-arrival measurements performed by said SPS receiver as a result of identifying one or more errant SPS signals.

13. A method as in claim 11 wherein a time-of-arrival measurement is corrected with a bias adjustment based on one of said peak width value or said SIR.

14. A method of measuring times of arrival of satellite signals received in a Satellite Positioning System (SPS) receiver, said method comprising:
    receiving a plurality of SPS signals from a plurality of SPS satellites;
    characterizing a signal environment corresponding to the location in which said SPS receiver is located, to produce environment data;
    selecting threshold values for one or more parameters related to one or more characteristics of said satellite signals using said environment data;
    measuring times of arrival of respective satellite signals from two or more satellites of said plurality of satellites, to produce a plurality of measured times of arrival; and
    testing data representing said times of arrival using said threshold values for said one or more parameters to produce a set of times of arrival with which to calculate a location fix for said SPS receiver.

15. The method of claim 14 wherein one or more characteristics of said environment data comprises at least one of a signal-to-noise ratio, a signal-to-interference ratio, an input signal strength, a signal attenuation, a correlation function waveform, and a peak-width value of a signal of said plurality of signals.

16. The method of claim 15 wherein said characterizing said signal environment further comprises characterizing said signal environment as an indoor environment if said SPS receiver receives said plurality of SPS signals while located inside a building, or as an outdoor environment if said SPS receiver receives said plurality of SPS signals while not located inside a building.

17. The method of claim 16 wherein said characterizing said signal environment further comprises characterizing said signal environment as an urban environment if said SPS receiver receives said plurality of SPS signals while located in an area with a pre-defined number of buildings, or as a rural environment if said SPS receiver receives said plurality of SPS signals while located in an area with fewer than said pre-defined number of buildings.

18. The method of claim 15 further comprising:
identifying one or more errant SPS signals; and
correcting time-of-arrival measurements performed by said SPS receiver as a result of identifying one or more errant SPS signals.

19. The method of claim 18 further comprising:
estimating a bias error in one or more measured times of arrival of said plurality of measured times of arrival, to produce an estimated bias value; and
correcting said plurality of measured times of arrival using said estimated bias value.

20. The method of claim 19 further comprising:
defining an error threshold for each measured time-of-arrival using said environment data;
comparing an error in said each measured time-of-arrival with said error threshold; and
removing a time-of-arrival measurement if said error in said time-of-arrival measurement exceeds said error threshold.

21. The method of claim 16 wherein said SPS receiver is included within a combination receiver and radio communication device, said combination receiver comprising a digital processor configured to execute said measuring said times of arrival of said satellite signals.

22. The method of claim 14 wherein said characterizing said signal environment comprises determining at least one of a signal-to-noise ratio, a signal-to-interference ratio, an input signal strength, a signal attenuation, a correlation function waveform, and a peak-width value of at least one signal of said plurality of SPS signals.

23. The method of claim 21 wherein said radio communication device comprises a cellular telephone, and wherein said location of said SPS receiver is within a cellular telephone transmission region.

24. A method as in claim 14 wherein said characterizing said signal environment comprises determining at least one of a signal-to-noise ratio, a signal-to-interference ratio, a signal strength, or a peak width value of a cellular communication signal which is received by a cellular communication system, wherein said SPS receiver and said cellular communication system are coupled together and are part of a combined system.

25. A method of processing satellite positioning system signals received by a satellite positioning system (SPS) receiver, said method comprising:
receiving a plurality of SPS signals from a plurality of in-view SPS satellites;
determining an integration period for each of said plurality of SPS signals, said integration period corresponding to a period of time used to perform a time-of-arrival measurement for each corresponding SPS signal;
determining a maximum correlation peak value and a correlation peak-width for each signal of said plurality of SPS signals;
determining a code phase corresponding to each said maximum correlation peak value;
determining a Doppler value for each of said plurality of SPS signals; and
determining one or more signal characteristics associated with each of said plurality of SPS signals.

26. The method of claim 25 further comprising:
determining a set of code phases around said maximum correlation peak value for said each of said plurality of SPS signals; and
setting a flag for each signal of said plurality of SPS signals for which there exist multiple peaks occurring within said integration period.

27. The method of claim 25 wherein said one or more signal characteristics associated with each of said plurality of SPS signals comprises at least one of a signal-to-noise ratio, a peak-width value, an input signal strength value, a signal attenuation, a correlation function waveform, and a signal-to-interference ratio.

28. The method of claim 27 further comprising characterizing a signal environment corresponding to the location in which said SPS receiver is located to produce environment data.

29. A method as in claim 28 further comprising:
calculating a position based at least in part on said environment data.

30. The method of claim 28 further comprising measuring a time-of-arrival of a SPS signal using said environment data and a corresponding maximum correlation peak value, Doppler value, code phase, and signal characteristics determined for said satellite.

31. A method as in claim 30 further comprising:
correcting a time-of-arrival measurement for SPS signals not satisfying a predetermined error threshold criteria.

32. A method as in claim 31 wherein said predetermined error threshold criteria comprises multiple peak values caused by multipath signals transmitted by one or more satellites of said plurality of satellites.

33. The method of claim 30 further comprising eliminating time-of-arrival measurements for SPS signals transmitted by satellites not meeting pre-determined threshold criteria.

34. The method of claim 30 further comprising eliminating time-of-arrival measurements for SPS signals not meeting pre-determined error threshold criteria.

35. The method of claim 34 wherein said pre-determined error threshold criteria comprises cross-correlation signals transmitted by one or more satellite of said plurality of satellites.

36. A method as in claim 25 wherein said set of code phases includes an entire code frame for each of said plurality of SPS signals.

37. A SPS receiver apparatus comprising:
an antenna for receiving SPS signals at an RF frequency from a plurality of inview satellites;
a downconverter coupled to said antenna, said downconverter reducing the RF frequency of said received SPS signals to an intermediate frequency (IF) to produce a baseband signal;
a digitizer coupled to said downconverter;
a processor coupled to said digitizer, wherein said processor is configured to:

determine a signal environment corresponding to the location in which said SPS receiver is located, to produce environment data;

select threshold values for one or more parameters related to one or more characteristics of said satellite signals using said environment data;

measure times of arrival of respective satellite signals from two or more satellites of said plurality of in-view satellites, to produce a plurality of measured times of arrival; and test data representing said times of arrival using said threshold values for said one or more parameters to produce a set of times of arrival with which to calculate a location fix for said SPS receiver.

38. The SPS receiver apparatus of claim 37 further comprising a communication antenna and a communication receiver coupled to said communication antenna and to said processor, said communication receiver operable to receive a data signal containing satellite data information over a communication link.

39. The SPS receiver apparatus of claim 38 wherein said set of times of arrival are transmitted to a basestation over said communication link.

40. The SPS receiver apparatus of claim 39 wherein said characteristics of said satellite signals are transmitted to said basestation over said communication link and said characteristics are used to derive said environment data.

41. The SPS receiver apparatus of claim 39 wherein said communication link comprises a cellular telephone transmission link.

42. The SPS receiver apparatus of claim 41 wherein said environment data specifies whether said SPS receiver is located indoors or outdoors, and whether said SPS receiver is located in an urban or rural location.

43. The SPS receiver apparatus of claim 42 wherein said environment data is input to said SPS receiver by a user.

44. The SPS receiver apparatus of claim 42 wherein said environment data is determined by analyzing data transmitted by said communication link.

45. A method of processing satellite positioning system (SPS) signals, said method comprising:

determining a first possible correlation peak for a first set of SPS signals from a first SPS satellite;

determining a second possible correlation peak for said first set of SPS signals wherein said second possible correlation peak follows said first possible correlation peak in time;

deriving a measurement representing a time-of-arrival of said first set of SPS signals from one of said first possible correlation peak and said second possible correlation peak;

transmitting from an SPS receiver which received said first set of SPS signals an identification that said first possible correlation peak and said second possible correlation peak have been determined.

46. A method as in claim 45 further comprising:

receiving at a remote processing system said measurement representing said time-of-arrival and receiving said identification, said remote processing system being coupled communicatively to said SPS receiver through a cellular radio frequency network.

47. A method of processing satellite positioning system (SPS) signals, said method comprising:

determining a first possible correlation peak for a first set of SPS signals from a first SPS satellite;

determining a second possible correlation peak for said first set of SPS signals wherein said second possible correlation peak follows said first possible correlation peak in time;

deriving a measurement representing a time-of-arrival of said first set of SPS signals from one of said first possible correlation peak and said second possible correlation peak;

identifying a wide peak correlation output and discarding said wide peak correlation output from measurements used to determine a position information for an SPS receiver which received said first set of SPS signals.

48. A method of processing satellite positioning system (SPS) signals, said method comprising:

determining a signal environment data which represents a manner in which SPS signals are propagated in a location at which an SPS receiver is located, wherein said signal environment data comprises data representing at least one of multipath conditions or interference conditions for SPS signals near said location;

determining how data representing SPS signals received by said SPS receiver is processed based on said signal environment data;

transmitting measurements representing time-of-arrivals of SPS signals at said SPS receiver;

receiving at a remote processing system said measurements representing time-of-arrivals through a cellular radio frequency communication link;

processing at said remote processing system said measurements representing time-of-arrivals to determine a position solution for said SPS receiver.

49. A method of processing satellite positioning system (SPS) signals, said method comprising:

determining a first possible correlation peak for a first set of SPS signals;

determining a second possible correlation peak for said first set of SPS signals;

deriving a measurement representing a time-of-arrival of said first set of SPS signals from one of said first possible correlation peak and said second possible correlation peak;

transmitting from an SPS receiver which received said first set of SPS signals an identification that said first possible correlation peak and said second possible correlation peak have been determined.

50. A method as in claim 49 wherein said second possible correlation peak follows said first possible correlation peak in time.

51. A method as in claim 50 wherein said second possible correlation peak results from a reflected SPS signal.

52. A method as in claim 51 wherein said measurement representing said time-of-arrival is derived from said first possible correlation peak.

53. A method as in claim 49 further comprising:

identifying a wide peak correlation output and discarding said wide peak correlation output from measurements used to determine a position information for said SPS receiver which received said first set of SPS signals.

54. A method as in claim 49 further comprising:

receiving at a remote processing system said measurement representing said time-of-arrival and receiving said identification, said re mote processing system being coupled communicatively to said SPS receiver through a cellular radio frequency network.

55. A method of processing satellite positioning system (SPS) signals, said method comprising:

determining from a cell based information source a signal environment which represents a manner in which SPS signals are propagated in a location at which an SPS receiver is located;

determining how data representing SPS signals received by said SPS receiver is processed based on said signal environment;

determining measurements representing time-of-arrivals of SPS signals, said measurements based on said signal environment;

transmitting said measurements representing time-of-arrivals of SPS signals at said SPS receiver;

receiving at a remote processing system said measurements representing time-of-arrivals through a cellular radio frequency communication link;

processing at said remote processing system said measurements representing time-of-arrivals to determine a position solution for said SPS receiver.

56. A method of processing satellite positioning system (SPS) signals, said method comprising:

determining a signal environment data which represents a manner in which SPS signals are propagated in a location at which an SPS receiver is located, wherein said signal environment data comprises data representing at least one of multipath conditions or interference conditions for SPS signals near said location;

determining how data representing SPS signals received by said SPS receiver is processed based on said signal environment data, wherein said determining determines an integration time used to perform a time-of-arrival measurement for SPS signals from at least one SPS satellite.

57. A method of processing satellite positioning system (SPS) signals, said method comprising:

determining a signal environment data which represents a manner in which SPS signals are propagated in a location at which an SPS receiver is located, wherein said signal environment data comprises data representing at least one of multipath conditions or interference conditions for SPS signals near said location;

determining how data representing SPS signals received by said SPS receiver is processed based on said signal environment data;

determining an SPS time-of-arrival measurement;

correcting said time-of-arrival measurement with a bias adjustment based on said signal environment.

\* \* \* \* \*